US012529971B2

(12) United States Patent
Saeki et al.

(10) Patent No.: US 12,529,971 B2
(45) Date of Patent: Jan. 20, 2026

(54) PROCESS CARTRIDGE

(71) Applicant: CANON KABUSHIKI KAISHA, Tokyo (JP)

(72) Inventors: Tatsuya Saeki, Shizuoka (JP); Takashi Kenmoku, Shizuoka (JP); Kozue Uratani, Shizuoka (JP); Koki Inoue, Shizuoka (JP); Kunihiko Sekido, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 641 days.

(21) Appl. No.: 17/936,104

(22) Filed: Sep. 28, 2022

(65) Prior Publication Data

US 2023/0119795 A1 Apr. 20, 2023

(30) Foreign Application Priority Data

Oct. 8, 2021 (JP) ................................ 2021-166516
Sep. 2, 2022 (JP) ................................ 2022-140110

(51) Int. Cl.
*G03G 5/147* (2006.01)
*G03G 9/08* (2006.01)
*G03G 9/097* (2006.01)

(52) U.S. Cl.
CPC ....... *G03G 5/14704* (2013.01); *G03G 9/0819* (2013.01); *G03G 9/0823* (2013.01); *G03G 9/09708* (2013.01)

(58) Field of Classification Search
CPC ............ G03G 5/17404; G03G 9/0823; G03G 9/09708
See application file for complete search history.

(56) References Cited

U.S. PATENT DOCUMENTS 5,385,798 A * 1/1995 Law .................. G03G 9/09708 430/108.1
6,777,153 B2 8/2004 Yano
(Continued)

FOREIGN PATENT DOCUMENTS

EP 0924561 A1 * 6/1999 ......... G03G 5/14708
EP 3367167 A1 * 8/2018 ............ G03G 15/04
(Continued)

OTHER PUBLICATIONS

Magome, Machine Translation of JP 4467764B2, May 26, 2010 (Year: 2010).*
(Continued)

*Primary Examiner* — Peter L Vajda
*Assistant Examiner* — Jenna Kuipers
(74) *Attorney, Agent, or Firm* — VENABLE LLP

(57) ABSTRACT

Provided is a process cartridge that is excellent in initial charge rising performance, and in charge uniformity of a halftone image throughout a long period of time from the start of use until after endurance. Specifically, provided is a process cartridge including: an electrophotographic photosensitive member; a toner; and a developing unit, wherein the toner contains toner particles and an external additive A, the external additive A, and wherein the electrophotographic photosensitive member includes an electroconductive support, a photosensitive layer, and a surface protective layer, wherein the surface protective layer contains electroconductive particles.

16 Claims, 2 Drawing Sheets

(56) References Cited

U.S. PATENT DOCUMENTS

| | | | |
|---|---|---|---|
| 6,808,907 | B2 | 10/2004 | Honma |
| 6,908,721 | B2 | 6/2005 | Kenmoku |
| 6,911,520 | B2 | 6/2005 | Fukui |
| 7,045,321 | B2 | 5/2006 | Imamura |
| 7,393,912 | B2 | 7/2008 | Mihara |
| 7,399,568 | B2 | 7/2008 | Fukui |
| 7,408,017 | B2 | 8/2008 | Imamura |
| 7,452,960 | B2 | 11/2008 | Yano |
| 7,510,813 | B2 | 3/2009 | Yano |
| 7,638,194 | B2 | 12/2009 | Fukui |
| 7,638,590 | B2 | 12/2009 | Fukui |
| 7,682,765 | B2 | 3/2010 | Sugawa |
| 7,795,363 | B2 | 9/2010 | Fukui |
| 7,935,771 | B2 | 5/2011 | Fukui |
| 8,067,136 | B2 | 11/2011 | Yano |
| 8,093,342 | B2 | 1/2012 | Minami |
| 8,110,329 | B2 | 2/2012 | Tominaga |
| 8,178,271 | B2 | 5/2012 | Fukui |
| 8,383,312 | B2 | 2/2013 | Fujimoto |
| 8,574,801 | B2 | 11/2013 | Itabashi |
| 8,609,312 | B2 | 12/2013 | Itabashi |
| 8,828,633 | B2 | 9/2014 | Itabashi |
| 8,918,035 | B2 | 12/2014 | Hasegawa |
| 9,029,056 | B2 | 5/2015 | Kenmoku |
| 9,098,002 | B2 | 8/2015 | Kenmoku |
| 9,098,003 | B2 | 8/2015 | Masumoto |
| 9,244,371 | B2 | 1/2016 | Suzumura |
| 9,304,422 | B2 | 4/2016 | Matsui |
| 9,348,246 | B2 | 5/2016 | Magome |
| 9,354,545 | B2 | 5/2016 | Matsui |
| 9,377,708 | B2 | 6/2016 | Magome |
| 9,423,711 | B2 | 8/2016 | Uratani |
| 9,423,714 | B2 | 8/2016 | Kenmoku |
| 9,442,416 | B2 | 9/2016 | Magome |
| 9,625,842 | B2 | 4/2017 | Uratani |
| 9,658,546 | B2 | 5/2017 | Tanaka |
| 9,804,514 | B2 | 10/2017 | Suzumura |
| 9,841,692 | B2 | 12/2017 | Hasegawa |
| 9,857,707 | B2 | 1/2018 | Tsuda |
| 9,964,874 | B2 | 5/2018 | Suzumura |
| 10,114,303 | B2 | 10/2018 | Katsura |
| 10,228,627 | B2 | 3/2019 | Nagashima |
| 10,241,430 | B2 | 3/2019 | Kimura |
| 10,289,016 | B2 | 5/2019 | Fukudome |
| 10,295,921 | B2 | 5/2019 | Ohmori |
| 10,310,397 | B2 | 6/2019 | Sano |
| 10,578,990 | B2 | 3/2020 | Tsuda |
| 10,698,327 | B2 | 6/2020 | Nagashima |
| 10,747,134 | B2 | 8/2020 | Watanabe |
| 10,747,136 | B2 | 8/2020 | Kenmoku |
| 10,768,540 | B2 | 9/2020 | Watanabe |
| 10,782,623 | B2 | 9/2020 | Yoshiba |
| 10,969,704 | B2 | 4/2021 | Kagawa |
| 11,112,708 | B2 | 9/2021 | Uratani |
| 11,112,709 | B2 | 9/2021 | Saeki |
| 11,112,713 | B2 | 9/2021 | Akiyama |
| 11,169,458 | B2 | 11/2021 | Toyoizumi |
| 11,175,600 | B2 | 11/2021 | Uchiyama |
| 11,256,187 | B2 | 2/2022 | Ogaki |
| 11,314,178 | B2 | 4/2022 | Kenmoku |
| 11,347,157 | B2 | 5/2022 | Kamikura |
| 2005/0260514 | A1 | 11/2005 | Mihara |
| 2006/0194071 | A1 | 8/2006 | Yano |
| 2012/0172562 | A1 | 7/2012 | Kenmoku |
| 2015/0185658 | A1 | 7/2015 | Wakabayashi |
| 2016/0378003 | A1 | 12/2016 | Arimura |
| 2021/0026265 | A1 | 1/2021 | Kamikura |
| 2021/0373450 | A1 | 12/2021 | Kawaguchi |
| 2021/0405549 | A1 | 12/2021 | Ookubo |
| 2022/0128916 | A1 | 4/2022 | Yoshida |
| 2022/0128918 | A1 | 4/2022 | Kototani |
| 2022/0146952 | A1 | 5/2022 | Komiya |
| 2022/0146955 | A1 | 5/2022 | Nozaki |
| 2022/0206402 | A1 | 6/2022 | Uratani |
| 2022/0214629 | A1 | 7/2022 | Kenmoku |
| 2022/0214630 | A1 | 7/2022 | Kamikura |
| 2022/0291601 | A1 | 9/2022 | Katsura |

FOREIGN PATENT DOCUMENTS

| | | | | |
|---|---|---|---|---|
| JP | 7-242422 | A | | 9/1995 |
| JP | 2001-125302 | A | | 5/2001 |
| JP | 2001-235896 | A | | 8/2001 |
| JP | 2007241091 | A | * | 9/2007 |
| JP | 2009-229495 | A | | 10/2009 |
| JP | 4467764 | B2 | * | 5/2010 |

OTHER PUBLICATIONS

Sugihara, Machine Translation of JP 2007-241091A, Sep. 20, 2007 (Year: 2007).*

U.S. Appl. No. 17/806,850, filed Jun. 14, 2022, Mayumi Inoue.

U.S. Appl. No. 17/814,089, filed Jul. 21, 2022, Masatake Tanaka.

U.S. Appl. No. 17/935,721, filed Sep. 27, 2022, Takashi Kenmoku.

U.S. Appl. No. 17/936,943, filed Sep. 30, 2022, Kozue Uratani.

U.S. Appl. No. 18/046,585, filed Oct. 14, 2022, Yuta Komiya.

U.S. Appl. No. 18/046,590, filed Oct. 14, 2022, Kosuke Fukudome.

U.S. Appl. No. 18/053,846, filed Nov. 9, 2022, Kenta Kamikura.

* cited by examiner

PROCESS CARTRIDGE

This application claims the benefit of Japanese Patent Application No. 2021-166516, filed Oct. 8, 2021, and Japanese Patent Application No. 2022-140110, filed Sep. 2, 2022, which are hereby incorporated by reference herein in their entirety.

BACKGROUND OF THE INVENTION

Field of the Invention

The present invention relates to a process cartridge to be used for a copying machine and a printer each using an electrophotographic system or an electrostatic recording system.

Description of the Related Art

In recent years, a further increase in process speed of an electrophotographic image forming apparatus and an increase in lifetime thereof have been widely demanded.

In an electrophotographic image forming apparatus having a further increased speed, a period of time for each of steps, such as charging and developing, in an electrophotographic process is shortened. Accordingly, in order to maintain the quality of an electrophotographic image, there is a need to develop a technology for instantly charging toner and stably maintaining the charging of the toner over a long period of time in any use environment.

In order to instantly charge toner, as described in Japanese Patent Application Laid-Open No. 2001-125302, there is known a technique involving externally adding an external additive having a certain resistance value to toner.

In addition, as described in Japanese Patent Application Laid-Open No. 2009-229495, there is known a technique involving maintaining stable electric characteristics by incorporating niobium atom-containing titanium oxide particles into a protective layer of an electrophotographic photosensitive member.

In Japanese Patent Application Laid-Open No. 2001-125302, although a certain effect has been found on the charge rising performance of the toner, it has been found that, in the electrophotographic image forming apparatus having a further increased speed, the charge rising performance is insufficient, and the density of a solid image immediately after the startup of the apparatus is not satisfactory. In addition, it has been recognized that, in the electrophotographic image forming apparatus having a further increased speed, the density uniformity of a halftone image is not sufficient with a process cartridge used for a long period of time. The inventors presume that the reason for the foregoing is as described below.

The toner having externally added thereto the external additive having a certain resistance value is regulated and triboelectrically charged with a blade or the like before a nip where the toner is developed from a developer carrying member onto an electrophotographic photosensitive member. However, in the electrophotographic image forming apparatus having a further increased speed, a period of time for triboelectric charging is not sufficient, and charging is not sufficient in a solid image, which consumes a large amount of the toner. That is a conceivable reason. Another conceivable reason is that the external additive is small and has such a shape as to be liable to be embedded in the toner, and the embedded portion is locally charged up, making it difficult to maintain the effect throughout a long period of use.

In addition, in Japanese Patent Application Laid-Open No. 2009-229495, improvements in charge rising performance immediately after the startup of the electrophotographic image forming apparatus and density uniformity of a halftone image after long-term use were not sufficient. The inventors presume that the reason for the foregoing is as described below.

A conceivable reason is that, although the charge of the surface protective layer hardly changes by virtue of the incorporation of the niobium atom-containing titanium oxide particles into the surface protective layer of the electrophotographic photosensitive member, there is no mechanism that may give a charge to the toner, and hence there is no improving effect on the chargeability of the toner.

SUMMARY OF THE INVENTION

Accordingly, an object of the present invention is to provide a process cartridge that, in an electrophotographic image forming apparatus having a further increased speed, is excellent in charge rising performance immediately after the startup of the apparatus, and in density uniformity of a halftone image throughout a long period of time from the start of the use of the process cartridge until after sufficient use thereof "Immediately after the startup of the electrophotographic image forming apparatus" is hereinafter sometimes expressed as "initial". In addition, "after sufficient use of the process cartridge" is hereinafter sometimes expressed as "after endurance".

There is provided a process cartridge that is detachable from a main body of an electrophotographic image forming apparatus, the process cartridge including: an electrophotographic photosensitive member; a toner; and a developing unit configured to accommodate the toner, and to supply the toner to a surface of the electrophotographic photosensitive member, wherein the toner contains toner particles and an external additive A, the external additive A satisfying the following requirements (i) to (iii): (i) having a long diameter of 100 nm or more and 3,000 nm or less; (ii) having an aspect ratio of 5.0 or more; and (iii) having a specific resistance of $1\times10^5$ Ω·cm or more and $1\times10^8$ Ω·cm or less, wherein a ratio of a number of the toner particle having the external additive A on surface thereof to a number of the toner particle is 30 number % or more when observed by using a scanning electron microscope, and wherein the electrophotographic photosensitive member includes a electroconductive support, a photosensitive layer formed on the electroconductive support, and a surface protective layer formed on the surface of the electrophotographic photosensitive member, wherein the surface protective layer contains electroconductive particles, wherein a content of the electroconductive particles in the surface protective layer is 5 vol % or more and 70 vol % or less, and wherein the surface protective layer has a volume resistivity of $1.0\times10^9$ Ω·cm or more and $1.0\times10^{14}$ Ω·cm or less.

Further features of the present invention will become apparent from the following description of exemplary embodiments with reference to the attached drawings.

DESCRIPTION OF THE EMBODIMENTS

Figure 1:
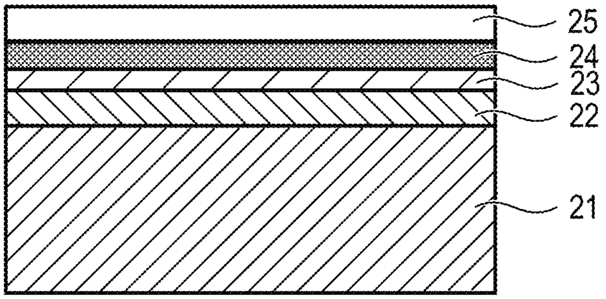
FIG. 1 is an illustration of an example of a schematic configuration of an electrophotographic photosensitive member.

The description "XX or more and YY or less" or "from XX to YY" representing a numerical range means a numerical range including a lower limit and an upper limit that are end points unless otherwise stated.

When the numerical ranges are described in a stepwise manner, the upper and lower limits of each numerical range may be arbitrarily combined.

A configuration of a process cartridge of the present invention is described below.

The process cartridge of the present invention is a process cartridge that is detachable from a main body of an electrophotographic image forming apparatus, the process cartridge including: an electrophotographic photosensitive member; a toner; and a developing unit configured to accommodate the toner, and to supply the toner to a surface of the electrophotographic photosensitive member, wherein the toner contains toner particles and an external additive A, the external additive A satisfying the following requirements (i) to (iii): (i) having a long diameter of 100 nm or more and 3,000 nm or less; (ii) having an aspect ratio of 5.0 or more; and (iii) having a specific resistance of $1\times10^5$ Ω·cm or more and $1\times10^8$ Ω·cm or less, wherein a ratio of a number of the toner particle having the external additive A on surface thereof to a number of the toner particle is 30 number % or more when observed by using a scanning electron microscope, and wherein the electrophotographic photosensitive member includes an electroconductive support, a photosensitive layer formed on the electroconductive support, and a surface protective layer formed on the surface of the electrophotographic photosensitive member, wherein the surface protective layer contains electroconductive particles, wherein a content of the electroconductive particles in the surface protective layer is 5 vol % or more and 70 vol % or less, and wherein the surface protective layer has a volume resistivity of $1.0\times10^9$ Ω·cm or more and $1.0\times10^{14}$ Ω·cm or less.

In view of the above-mentioned problems, the inventors have made investigations on a technique involving performing injection charging of a toner from an electrophotographic photosensitive member simultaneously with its entry into a nip where the toner is developed from a developer carrying member onto the electrophotographic photosensitive member. In general, the toner is regulated by the developer carrying member, and triboelectrically charged. Meanwhile, the inventors have conceived that, when, in addition to the triboelectric charging, a charge is injected into the toner from the electrophotographic photosensitive member simultaneously with its entry into the developing nip, stable charging performance of the toner is shown from immediately after the startup of the apparatus even in an electrophotographic image forming apparatus having an increased speed.

The inventors have made investigations based on the discussion presented above, and as a result, have found that, when the external additive A having a specific volume resistance and having a deformed shape with a large surface area is arranged in the surface layer of each of the toner particles, a charge is injected from the electrophotographic photosensitive member into the toner via the external additive A. Further, it has been found that the following unexpected effect is also obtained: such charge-injecting property is maintained even after endurance. Such configuration has enabled the provision of a process cartridge excellent in charge rising performance immediately after the startup of the electrophotographic image forming apparatus and in density uniformity in long-term use.

The electrophotographic photosensitive member of the present invention includes, in this order, an electroconductive support, and a photosensitive layer and a surface protective layer which are formed on the electroconductive support.

The surface protective layer contains electroconductive particles, and the content of the electroconductive particles is 5 vol % or more and 70 vol % or less of the surface protective layer. In addition, the volume resistivity of the surface protective layer is $1.0\times10^9$ Ω·cm or more and $1.0\times10^{14}$ Ω·cm or less. The volume resistivity is measured under an atmosphere having a temperature of 23° C. and a humidity of 50RH %. When the volume resistivity falls within the above-mentioned range, despite the incorporation of a large amount of the electroconductive particles into the surface protective layer, the volume resistivity is kept relatively high, and hence a charge can be injected into the toner via the electroconductive particles while charge retentivity is secured.

From the viewpoint of making the charge-injecting property suitable to make satisfactory a density immediately after the startup of the electrophotographic image forming apparatus and the density uniformity of the process cartridge over a long period of time from the start of use until after sufficient use, the content ratio of the electroconductive particles in the surface protective layer is more preferably 20 vol % or more and 70 vol % or less, still more preferably 40 vol % or more and 70 vol % or less. In addition, from the same viewpoint, the volume resistivity of the surface protective layer is $1.0\times10^9$ Ω·cm or more and $1.0\times10^{14}$ Ω·cm or less, preferably $1.0\times10^{10}$ Ω·cm or more and $1.0\times10^{14}$ Ω·cm or less. The volume resistivity of the surface protective layer may be controlled based on, for example, the particle diameter of the electroconductive particles.

Examples of the electroconductive particles contained in the surface protective layer include particles of a metal oxide, such as titanium oxide, zinc oxide, tin oxide, or indium oxide. When the metal oxide is used as the electroconductive particles, the metal oxide may be doped with an element, such as niobium, phosphorus, or aluminum, or an oxide thereof.

The electroconductive particles in the electrophotographic photosensitive member of the present invention are preferably titanium oxide particles. The titanium oxide particles are produced by a known technique. For example, reference may be made to Japanese Patent Application Laid-Open No. H07-242422.

The particle diameter of the electroconductive particles is preferably 5 nm or more and 300 nm or less, more preferably 40 nm or more and 300 nm or less, still more preferably 100 nm or more and 250 nm or less in terms of number-average particle diameter from the viewpoints of a moisture adsorption amount and the dispersibility of the particles.

Figure 3:
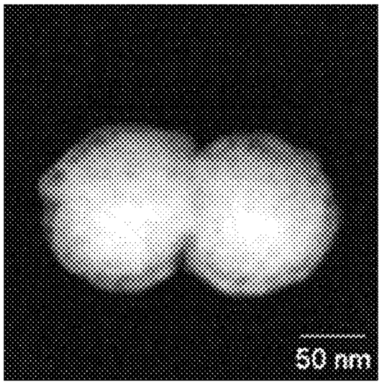
FIG. 3 is a STEM image of an example of niobium-containing titanium oxide particles used in Examples of the present invention.
Figure 4:
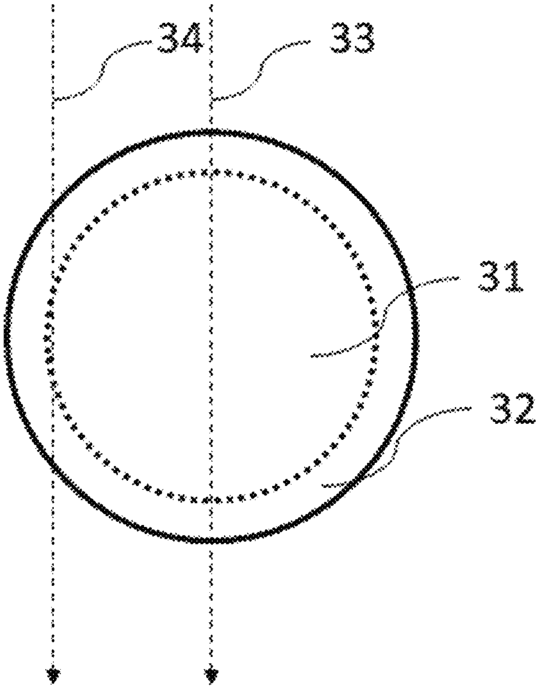
FIG. 4 is a schematic view of an example of the niobium-containing titanium oxide particles used in Examples of the present invention.

The electroconductive particles are particularly preferably titanium oxide particles each of which contains niobium, and has a configuration in which niobium is localized in the vicinity of the surface of the particle. This is because the localization of niobium in the vicinity of the surface enables efficient transfer of a charge. More specifically, in each of the titanium oxide particles, a concentration ratio calculated as "niobium atom concentration/titanium atom concentration" at an inside portion at 5% of the maximum diameter from the surface of the particle is 2.0 or more times as high as a concentration ratio calculated as "niobium atom concentration/titanium atom concentration" at the center of the particle. When the concentration ratio at the inside portion at 5% of the maximum primary particle diameter from the surface is set to be 2.0 or more times as high as the concentration ratio at the central portion, a charge can easily move in the protective layer, and hence the property of injecting a charge from the electrophotographic photosensitive member into the toner can be enhanced. The niobium atom concentration and the titanium atom concentration are obtained through use of a scanning transmission electron microscope (STEM) having connected thereto an EDS analyzer (energy-dispersive X-ray spectrometer). A STEM image of an example (X1) of titanium oxide particles used in Examples of the present invention is shown in FIG. 3. In addition, the STEM image of FIG. 3 is schematically illustrated in FIG. 4. As described in detail later, titanium oxide particles each containing niobium used in Examples of the present invention are produced by coating titanium oxide particles each serving as a core with titanium oxide containing niobium, and then firing the resultant. Accordingly, the coating titanium oxide containing niobium is conceived to undergo crystal growth as niobium-doped titanium oxide through so-called epitaxial growth along a crystal of the titanium oxide serving as the core. As shown in FIG. 3, the thus produced titanium oxide containing niobium has a lower density in a surface vicinity 32 than at a particle central portion 31, indicating a core-shell-like form. In addition, in the EDS analysis with the STEM, an X-ray is transmitted through an entire particle, and hence, as illustrated in FIG. 4, as compared to EDS analysis with an X-ray 33 transmitted through the particle central portion 31, EDS analysis with an X-ray 34 for analyzing the inside portion at 5% of the primary particle diameter is more significantly influenced by the surface vicinity 32. That is, in each of such niobium-containing titanium oxide particles as described above, the niobium/titanium atom concentration ratio at the inside portion at 5% of the maximum diameter from the surface of the particle is 2.0 or more times as high as the niobium/titanium atom concentration ratio at the center of the particle, and the niobium atom is localized in the vicinity of the surface. The analysis with the STEM having connected thereto the EDS involves observation with the transmission electron microscope and measurement of the niobium/titanium ratios with the EDS. In addition, the niobium/titanium ratios may also be directly measured from the electrophotographic photosensitive member by slicing the electrophotographic photosensitive member through use of a microtome, Ar milling, FIB, or the like.

The titanium oxide particles each containing a niobium atom are preferably anatase-type or rutile-type titanium oxide particles, more preferably anatase-type titanium oxide particles. When anatase-type titanium oxide is used, the movement of a charge in the surface protective layer is facilitated, and hence charge injection becomes satisfactory. The electroconductive particles are more preferably anatase-type titanium oxide particles each having a niobium atom localized in the vicinity of the surface of the particle. When the anatase-type titanium oxide particles are each used as a core, and the surface thereof is coated with titanium oxide containing a niobium atom, a charge can easily move in the surface protective layer, and at the same time, the property of injecting a charge into the toner can be enhanced. In addition, a reduction in volume resistivity of the surface protective layer can be suppressed.

In each the electroconductive particles, for the purpose of uniformizing the charging of the electrophotographic photosensitive member, the atom concentration ratio of the Nb atom to the Ti atom at the inside portion at 5% of the maximum diameter from the surface is preferably 0.02 or more and 0.20 or less. In addition, the amount of the niobium atom is preferably 2.6 mass % or more and 10.0 mass % or less with respect to the mass of each of the titanium oxide particles.

In order that the external additive A may be hardly embedded in the toner and have a large surface area, and that injection charging using the external additive as an origin may be efficiently performed, a preferred example of its shape is as described below. That is, the external additive A preferably has a shape other than a spherical shape, and preferably has a shape that is longer in the direction of one axis in a three-dimensional structure (the axis is referred to as "long axis"). The shape of a cross-section obtained by cutting the external additive A perpendicularly to its long axis direction is not limited, and may be a circle, a quadrangle, a triangle, a polygon, or a combination thereof. In addition, the cross-sectional area of the cross-section may be substantially the same across the entirety of the long axis direction, or may change, and the following shape may be adopted: the cross-sectional area is small or large at both ends with respect to the long axis direction, or the cross-sectional area at one end in the long axis direction is smaller than the cross-sectional area at the other end. That is, examples of the shape of the external additive A include: the shape of a columnar body (circular column, quadrangular column, triangular column, or polygonal column), a columnar body with a thick middle part, a columnar body with a thin middle part, or a conical body (circular cone, quadrangular pyramid, triangular pyramid, or polygonal pyramid); a partial shape obtained by cutting any of the foregoing; a needle shape (columnar body or conical body whose long axis is sufficiently longer than its short axis); a rod shape; and a mixture thereof. The "long diameter" of the external additive A refers to the length of the long axis of the external additive, and the "short diameter" refers to the circle-equivalent diameter of a cross-section perpendicular to the long axis at a position at which the cross-sectional area thereof becomes maximum. A number average is used as a representative value for each of the long diameter and the short diameter.

The external additive A has a long diameter of 100 nm or more and 3,000 nm or less, preferably 500 nm or more and 2,000 nm or less, more preferably 800 nm or more and 1,700 nm or less. When the long diameter of the external additive A falls within these ranges, the efficiency of injection charging from the electrophotographic photosensitive member is increased, and besides, the embedding of the external additive A in the toner particles is suppressed, and hence the uniformity of a solid image is improved throughout a long period of use. The reason why the uniformity of the solid image is improved is conceivably as follows: before the nip where the toner is developed from the developer carrying member onto the electrophotographic photosensitive member, the external additive A is brought into contact with the electrophotographic photosensitive member an instant earlier to cause injection charging of the toner with the point of contact serving as an origin.

The external additive A has an aspect ratio, that is, long diameter/short diameter, of 5.0 or more, preferably 6.0 or more, more preferably 8.0 or more. When the aspect ratio of the external additive A falls within these ranges, the injection charging of the toner from the electrophotographic photosensitive member is made efficient to make satisfactory the solid density immediately after the startup of the electrophotographic image forming apparatus and the density uniformity throughout a sufficient period of use. The upper limit of the aspect ratio is not particularly limited, but is preferably 20.0 or less, more preferably 16.0 or less from the viewpoint that particles each having a suitable particle diameter can be easily produced.

The external additive A has a specific resistance of $1.0\times10^5$ Ω·cm or more and $1.0\times10^8$ Ω·cm or less, preferably $1.0\times10^6$ Ω·cm or more and $5.0\times10^7$ Ω·cm or less. When the specific resistance falls within these ranges, the injection charging of the toner is efficiently performed, and the leakage of a charge is reduced, with the result that charge rising performance immediately after the startup of the electrophotographic image forming apparatus and charging uniformity until after endurance can both be achieved.

In the toner, the ratio of the number of toner particles for each of which it can be recognized that the external additive A is present on the surface thereof to the number the total toner particles is 30 number % or more, preferably 40 number % or more, more preferably 50 number % or more. The purpose that is the injection charging of the toner only needs to be fulfilled, and the upper limit of the above-mentioned ratio is not particularly limited, but is preferably 95 number % or less, more preferably 90 number % or less from the viewpoint of preventing the toner from having an excessive negative charge.

That the external additive A is present on the surface means that one or more particles of the external additive A can be recognized on the surface of the toner particle. That the external additive A is present on the surface may be recognized by observing the toner using a scanning microscope.

A material for the external additive A is not limited as long as the above-mentioned physical property ranges are satisfied, but is preferably, for example, inorganic particles, such as titanium oxide particles or aluminum oxide particles.

The external additive A particularly preferably contains titanium oxide particles. When the external additive A contains the titanium oxide particles, the resistance value can be easily set to a desired range, and halftone unevenness after endurance is satisfactorily suppressed.

The external additive A more preferably contains rutile-type titanium oxide particles. When the external additive A contains the rutile-type titanium oxide particles, the toner can be efficiently charged without leaking a charge injected from the surface of the electrophotographic photosensitive member to the outside.

In the present invention, the toner particles each preferably contain boric acid. When the toner particles each contain boric acid, performance by which a charge injected into the toner is retained is improved to improve image quality throughout a sufficient period of use.

Boric acid is preferably present in the vicinity of the surface of the toner. Whether or not boric acid in the toner particles is present in the vicinity of the surface of the toner is determined by ATR-IR analysis using germanium. That is, the detection of boric acid in the ATR-IR analysis using germanium means that boric acid is present in the vicinity of the surface of the toner. When boric acid is caused to be present in the vicinity of the surface of the toner, the charging of the toner charged by injection charging is maintained, and hence image quality can be improved throughout a sufficient period of use.

A method of incorporating boric acid into the toner particles is not particularly limited. For example, boric acid may be incorporated into the toner particles by being internally added to the toner particles, or being used as an aggregating agent in an aggregation method. When boric acid is added as the aggregating agent, boric acid can be easily introduced in the vicinity of the surface of each of the toner particles. Raw materials for boric acid include raw materials in the states of organic boric acid, a boric acid salt, a boric acid ester, and the like. When the toner particles are produced in an aqueous medium, boric acid is preferably added as a boric acid salt from the viewpoints of reactivity and production stability. Specific examples thereof include sodium tetraborate and ammonium borate. Of those, borax is particularly preferably used.

Borax is represented as the decahydrate of sodium tetraborate $Na_2B_4O_7$, and changes into boric acid in an acidic aqueous solution, and hence borax is preferably used when used under an acidic environment in an aqueous medium. Borax is preferably contained at from 0.1 mass % to 10 mass % in each of the toner particles.

The configuration of the toner in the present invention is described below.

<Binder Resin>

The toner particles each contain a binder resin. The content of the binder resin is preferably 50 mass % or more of the total amount of resin components in each of the toner particles.

The binder resin only needs to contain a resin having an ester bond, and is not particularly limited, and a known resin may be used. A styrene-acrylic resin or a polyester resin is preferred. A polyester resin is more preferred.

The polyester resin is obtained by synthesis from a combination of suitable materials selected from a polyvalent carboxylic acid, a polyol, a hydroxycarboxylic acid, and the like through use of a known method, such as a transesterification method or a polycondensation method. The polyester resin preferably contains a condensation polymer of a dicarboxylic acid and a diol.

The polyvalent carboxylic acid is a compound containing two or more carboxy groups in one molecule. Of such compounds, the dicarboxylic acid is a compound containing two carboxy groups in one molecule, and is preferably used.

Examples of the dicarboxylic acid may include oxalic acid, succinic acid, glutaric acid, maleic acid, adipic acid, β-methyladipic acid, azelaic acid, sebacic acid, nonanedicarboxylic acid, decanedicarboxylic acid, undecanedicarboxylic acid, dodecanedicarboxylic acid, fumaric acid, citraconic acid, diglycolic acid, cyclohexane-3,5-diene-1,2-carboxylic acid, hexahydroterephthalic acid, malonic acid, pimelic acid, suberic acid, phthalic acid, isophthalic acid, terephthalic acid, tetrachlorophthalic acid, chlorophthalic acid, nitrophthalic acid, p-carboxyphenylacetic acid, p-phenylenediacetic acid, m-phenylenediacetic acid, o-phenylenediacetic acid, diphenylacetic acid, diphenyl-p,p'-dicarboxylic acid, naphthalene-1,4-dicarboxylic acid, naphthalene-1,5-dicarboxylic acid, naphthalene-2,6-dicarboxylic acid, anthracenedicarboxylic acid, and cyclohexanedicarboxylic acid.

In addition, examples of the polyvalent carboxylic acids other than the above-mentioned dicarboxylic acids include trimellitic acid, trimesic acid, pyromellitic acid, naphthalenetricarboxylic acid, naphthalenetetracarboxylic acid, pyrenetricarboxylic acid, pyrenetetracarboxylic acid, itaconic acid, glutaconic acid, n-dodecylsuccinic acid, n-dodecenylsuccinic acid, isododecylsuccinic acid, isododecenylsuccinic acid, n-octylsuccinic acid, and n-octenylsuccinic acid. Those carboxylic acids may be used alone or in combination thereof.

The polyol is a compound containing two or more hydroxy groups in one molecule. Of such compounds, the diol is a compound containing two hydroxy groups in one molecule, and is preferably used.

Specific examples of the diol may include ethylene glycol, diethylene glycol, triethylene glycol, 1,2-propanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, 1,14-eicosanedecanediol, dipropylene glycol, polyethylene glycol, polypropylene glycol, polytetramethylene ether glycol, 1,4-cyclohexanediol, 1,4-cyclohexanedimethanol, 1,4-butenediol, neopentyl glycol, polytetramethylene glycol, hydrogenated bisphenol A, bisphenol A, bisphenol F, bisphenol S, and alkylene oxide (e.g., ethylene oxide, propylene oxide, and butylene oxide) adducts of the above-mentioned bisphenols.

Of those, an alkylene glycol having 2 or more and 12 or less carbon atoms and an alkylene oxide adduct of a bisphenol are preferred, and combined use of the alkylene oxide adduct of a bisphenol with the alkylene glycol having 2 or more and 12 or less carbon atoms is particularly preferred. An example of the alkylene oxide adduct of bisphenol A is a compound represented by the following formula (A).

(A)

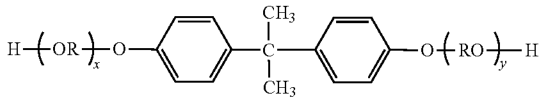

In the formula (A), Rs each independently represent an ethylene group or a propylene group, "x" and "y" each represent an integer of 0 or more, and the average of x+y is 0 or more and 10 or less.

The alkylene oxide adduct of bisphenol A is preferably a propylene oxide adduct and/or ethylene oxide adduct of bisphenol A. A propylene oxide adduct is more preferred. In addition, the average of x+y is preferably 1 or more and 5 or less.

A trihydric or higher alcohol is, for example, glycerin, trimethylolethane, trimethylolpropane, pentaerythritol, hexamethylol melamine, hexaethylol melamine, tetramethylol benzoguanamine, tetraethylol benzoguanamine, sorbitol, trisphenol PA, phenol novolac, cresol novolac, and alkylene oxide adducts of the above-mentioned trihydric or higher alcohols. Those alcohols may be used alone or in combination thereof.

Examples of the styrene-acrylic resin include homopolymers each formed of any one of the following polymerizable monomers, or copolymers each obtained by combining two or more kinds thereof, and mixtures thereof.

Styrene-based monomers, such as styrene, α-methylstyrene, β-methylstyrene, o-methylstyrene, m-methylstyrene, p-methylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene, and p-phenylstyrene.

(Meth)acrylic monomers, such as methyl (meth)acrylate, ethyl (meth)acrylate, n-propyl (meth)acrylate, iso-propyl (meth)acrylate, n-butyl (meth)acrylate, iso-butyl (meth) acrylate, tert-butyl (meth)acrylate, n-amyl (meth)acrylate, n-hexyl (meth)acrylate, 2-ethylhexyl (meth)acrylate, n-octyl (meth)acrylate, n-nonyl (meth)acrylate, cyclohexyl (meth) acrylate, benzyl (meth)acrylate, dimethyl phosphate ethyl (meth)acrylate, diethyl phosphate ethyl (meth)acrylate, dibutyl phosphate ethyl (m eth)acrylate, 2-benzoyloxyethyl (meth)acrylate, (meth)acrylonitrile, 2-hydroxyethyl (m eth) acrylate, (meth)acrylic acid, and maleic acid.

Vinyl ether-based monomers, such as vinyl methyl ether and vinyl isobutyl ether; vinyl ketone-based monomers, such as vinyl methyl ketone, vinyl ethyl ketone, and vinyl isopropenyl ketone; and polyolefin-based monomers, such as ethylene, propylene, and butadiene.

A polyfunctional polymerizable monomer may be used as the styrene-acrylic resin as required. Examples of the polyfunctional polymerizable monomer include diethylene glycol di(meth)acrylate, triethylene glycol di(meth)acrylate, tetraethylene glycol di(meth)acrylate, polyethylene glycol di(meth)acrylate, 1,6-hexanediol di(meth)acrylate, neopentyl glycol di(meth)acrylate, tripropylene glycol di(meth) acrylate, polypropylene glycol di(meth)acrylate, 2,2'-bis(4-((meth)acryloxydiethoxy)phenyl)propane, trimethylolpropane tri(meth)acrylate, tetramethylolmethane tetra(meth)acrylate, divinylbenzene, divinylnaphthalene, and divinyl ether.

In addition, in order to control a polymerization degree, a known chain transfer agent and polymerization inhibitor may be further added.

Examples of the polymerization initiator for obtaining the styrene-acrylic resin include an organic peroxide-based initiator and an azo-based polymerization initiator.

Examples of the organic peroxide-based initiator include benzoyl peroxide, lauroyl peroxide, di-α-cumyl peroxide, 2,5-dimethyl-2,5-bis(benzoylperoxy)hexane, bis(4-t-butylcyclohexyl) peroxydicarbonate, 1,1-bis(t-butylperoxy)cyclododecane, t-butyl peroxymaleate, bis(t-butylperoxy) isophthalate, methyl ethyl ketone peroxide, tert-butyl peroxy-2-ethylhexanoate, diisopropyl peroxycarbonate, cumene hydroperoxide, 2,4-dichlorobenzoyl peroxide, and tert-butyl-peroxypivalate.

Examples of the azo-based polymerization initiator include 2,2'-azobis-(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile, azobismethylbutyronitrile, and 2,2'-azobis-(methyl isobutyrate).

In addition, a redox-based initiator obtained by combining an oxidizing substance and a reducing substance may also be used as the polymerization initiator.

Examples of the oxidizing substance include inorganic peroxides, such as hydrogen peroxide and persulfuric acid salts (sodium salt, potassium salt, and ammonium salt), and oxidizing metal salts such as a tetravalent cerium salt.

Examples of the reducing substance include: reducing metal salts (divalent iron salt, monovalent copper salt, and trivalent chromium salt); ammonia; amino compounds, such as lower amines (amines each having about 1 or more and 6 or less carbon atoms, such as methylamine and ethylamine) and hydroxylamine; reducing sulfur compounds, such as sodium thiosulfate, sodium hydrosulfite, sodium bisulfite, sodium sulfite, and sodium formaldehyde sulfoxylate; lower alcohols (each having 1 or more and 6 or less carbon atoms); ascorbic acid or salts thereof; and lower aldehydes (each having 1 or more and 6 or less carbon atoms).

The polymerization initiators are selected with reference to their 10-hour half-life temperatures, and are utilized alone or as a mixture thereof. The addition amount of the polymerization initiator varies depending on the target polymerization degree, but in general, 0.5 part by mass or more and 20.0 parts by mass or less thereof is added with respect to 100.0 parts by mass of the polymerizable monomer(s).

<Releasing Agent>

A known wax may be used as a releasing agent for the toner in the present invention.

Specific examples thereof include: petroleum-based waxes typified by a paraffin wax, a microcrystalline wax, and petrolatum, and derivatives thereof; a Montan wax and derivatives thereof; a hydrocarbon wax produced by a Fischer-Tropsch process and derivatives thereof; polyolefin waxes typified by polyethylene, and derivatives thereof and natural waxes typified by a carnauba wax and a candelilla wax, and derivatives thereof. The derivatives include oxides, and block copolymerization products or graft-modified products with vinyl monomers.

The examples also include: alcohols such as a higher aliphatic alcohol; fatty acids, such as stearic acid and palmitic acid, acid amides, esters, and ketones thereof; a hydrogenated castor oil and derivatives thereof plant waxes; and animal waxes. Those releasing agents may be used alone or in combination thereof.

Of those, a polyolefin, a hydrocarbon wax produced by a Fischer-Tropsch process, or a petroleum-based wax is preferred because, when any of these waxes is used, developability and transferability tend to be improved. Those waxes may each have added thereto an antioxidant to the extent that the toner does not affect the effect of the present invention.

In addition, from the viewpoint of a phase separation property with respect to the binder resin or a crystallization temperature, suitable examples of the wax may include higher fatty acid esters, such as behenyl behenate and dibehenyl sebacate.

In addition, when the releasing agent is used, the content thereof is preferably 1.0 part by mass or more and 30.0 parts by mass or less with respect to 100.0 parts by mass of the binder resin.

The melting point of the releasing agent is preferably 30° C. or more and 120° C. or less, more preferably 60° C. or more and 100° C. or less.

When a releasing agent exhibiting such thermal characteristic as described above is used, a releasing effect is efficiently expressed, and hence a wider fixation region is secured.

<Plasticizer>

A crystalline plasticizer is preferably used for the toner in the present invention in order to improve a sharp melt property. The plasticizer is not particularly limited, and such known plasticizers to be used for toner as described below may be used.

Specific examples thereof may include: esters of monohydric alcohols and aliphatic carboxylic acids and esters of monovalent carboxylic acids and aliphatic alcohols, such as behenyl behenate, stearyl stearate, and palmityl palmitate; esters of dihydric alcohols and aliphatic carboxylic acids and esters of divalent carboxylic acids and aliphatic alcohols, such as ethylene glycol distearate, dibehenyl sebacate, and hexanediol dibehenate; esters of trihydric alcohols and aliphatic carboxylic acids and esters of trivalent carboxylic acids and aliphatic alcohols, such as glycerin tribehenate; esters of tetrahydric alcohols and aliphatic carboxylic acids and esters of tetravalent carboxylic acids and aliphatic alcohols, such as pentaerythritol tetrastearate and pentaerythritol tetrapalmitate; esters of hexahydric alcohols and aliphatic carboxylic acids and esters of hexavalent carboxylic acids and aliphatic alcohols, such as dipentaerythritol hexastearate and dipentaerythritol hexapalmitate; esters of polyhydric alcohols and aliphatic carboxylic acids and esters of polyvalent carboxylic acids and aliphatic alcohols, such as polyglycerin behenate; and natural ester waxes, such as a carnauba wax and a rice wax. Those plasticizers may be used alone or in combination thereof.

<Colorant>

The toner particles may each contain a colorant. A known pigment or dye may be used as the colorant. The colorant is preferably a pigment because of excellent weather resistance.

A cyan-based colorant is, for example, a copper phthalocyanine compound and derivatives thereof, an anthraquinone compound, and a base dye lake compound.

Specific examples thereof include C.I. Pigment Blue 1, C.I. Pigment Blue 7, C.I. Pigment Blue 15, C.I. Pigment Blue 15:1, C.I. Pigment Blue 15:2, C.I. Pigment Blue 15:3, C.I. Pigment Blue 15:4, C.I. Pigment Blue 60, C.I. Pigment Blue 62, and C.I. Pigment Blue 66.

A magenta-based colorant is, for example, a condensed azo compound, a diketopyrrolopyrrole compound, an anthraquinone compound, a quinacridone compound, a base dye lake compound, a naphthol compound, a benzimidazolone compound, a thioindigo compound, and a perylene compound.

Specific examples thereof include C.I. Pigment Red 2, C.I. Pigment Red 3, C.I. Pigment Red 5, C.I. Pigment Red 6, C.I. Pigment Red 7, C.I. Pigment Violet 19, C.I. Pigment Red 23, C.I. Pigment Red 48:2, C.I. Pigment Red 48:3, C.I. Pigment Red 48:4, C.I. Pigment Red 57:1, C.I. Pigment Red 81:1, C.I. Pigment Red 122, C.I. Pigment Red 144, C.I. Pigment Red 146, C.I. Pigment Red 150, C.I. Pigment Red 166, C.I. Pigment Red 169, C.I. Pigment Red 177, C.I. Pigment Red 184, C.I. Pigment Red 185, C.I. Pigment Red 202, C.I. Pigment Red 206, C.I. Pigment Red 220, C.I. Pigment Red 221, C.I. Pigment Red 254, and C.I. Pigment Violet 19.

A yellow-based colorant is, for example, a condensed azo compound, an isoindolinone compound, an anthraquinone compound, an azo metal complex, a methine compound, and an allyl amide compound.

Specific examples thereof include C.I. Pigment Yellow 12, C.I. Pigment Yellow 13, C.I. Pigment Yellow 14, C.I. Pigment Yellow 15, C.I. Pigment Yellow 17, C.I. Pigment Yellow 62, C.I. Pigment Yellow 74, C.I. Pigment Yellow 83, C.I. Pigment Yellow 93, C.I. Pigment Yellow 94, C.I. Pigment Yellow 95, C.I. Pigment Yellow 97, C.I. Pigment Yellow 109, C.I. Pigment Yellow 110, C.I. Pigment Yellow 111, C.I. Pigment Yellow 120, C.I. Pigment Yellow 127, C.I. Pigment Yellow 128, C.I. Pigment Yellow 129, C.I. Pigment Yellow 147, C.I. Pigment Yellow 151, C.I. Pigment Yellow 154, C.I. Pigment Yellow 155, C.I. Pigment Yellow 168, C.I. Pigment Yellow 174, C.I. Pigment Yellow 175, C.I. Pigment Yellow 176, C.I. Pigment Yellow 180, C.I. Pigment Yellow 181, C.I. Pigment Yellow 185, C.I. Pigment Yellow 191, and C.I. Pigment Yellow 194.

A black colorant is, for example, a colorant toned to a black color with carbon black, and the yellow-based colorant, the magenta-based colorant, and the cyan-based colorant.

Those colorants may be used alone or as a mixture thereof, and may each be used under the state of a solid solution.

When the colorant is used, 1.0 part by mass or more and 20.0 parts by mass or less thereof is preferably used with respect to 100.0 parts by mass of the binder resin.

<Charge Control Agent and Charge Control Resin>

The toner particles may each contain a charge control agent or a charge control resin.

As the charge control agent, a known one may be utilized, and in particular, a charge control agent having a high triboelectric charging speed and being capable of stably maintaining a constant triboelectric charging amount is preferred. Further, when the toner particles are produced by a suspension polymerization method, a charge control agent having a low polymerization-inhibiting property and being substantially free of matter solubilized in an aqueous medium is particularly preferred.

Examples of a charge control agent that controls the toner so that the toner may be negatively chargeable include a monoazo metal compound, an acetylacetone metal compound, aromatic oxycarboxylic acid-, aromatic dicarboxylic acid-, oxycarboxylic acid-, and dicarboxylic acid-based metal compounds, an aromatic oxycarboxylic acid, aromatic monocarboxylic and polycarboxylic acids, and metal salts, anhydrides, and esters thereof, phenol derivatives such as a bisphenol, urea derivatives, a metal-containing salicylic acid-based compound, a metal-containing naphthoic acid-based compound, a boron compound, a quaternary ammonium salt, a calixarene, and a charge control resin.

Examples of the charge control resin may include polymers and copolymers each having a structure of sulfonic acid, a sulfonic acid salt, or a sulfonic acid ester. The polymer having the structure of sulfonic acid, a sulfonic acid salt, or a sulfonic acid ester is particularly preferably the following polymer. That is, a polymer containing a sulfonic acid group-containing acrylamide-based monomer or a sulfonic acid group-containing methacrylamide-based monomer at a copolymerization ratio of 2 mass % or more is preferred, and a polymer containing 5 mass % or more thereof is more preferred.

The charge control resin preferably has a glass transition temperature (Tg) of 35° C. or more and 90° C. or less, a peak molecular weight (Mp) of 10,000 or more and 30,000 or less, and a weight-average molecular weight (Mw) of 25,000 or more and 50,000 or less. When such charge control resin is used, preferred triboelectric charging characteristics can be imparted without affecting thermal characteristics required of the toner particles. Further, the charge control resin contains a sulfonic acid structure, and hence, for example, the dispersibility of the charge control resin itself in a polymerizable monomer composition, and the dispersibility of the colorant and the like therein are improved, with the result that coloring power, transparency, and the triboelectric charging characteristics can be further improved.

Those charge control agents or charge control resins may be added alone or in combination thereof.

When the charge control agent or the charge control resin is used, the addition amount thereof is preferably 0.01 part by mass or more and 20.0 parts by mass or less, more preferably 0.5 part by mass or more and 10.0 parts by mass or less with respect to 100.0 parts by mass of the binder resin.

<External Additives>

The toner contains the external additive A, and may contain another external additive.

The external additive A has a long diameter (maximum diameter) of 100 nm or more and 3,000 nm or less, preferably 500 nm or more and 2,000 nm or less, more preferably 800 nm or more and 1,700 nm or less, an aspect ratio of 5.0 or more, preferably 6.0 or more, more preferably 8.0 or more, and a specific resistance of $1.0\times10^5$ Ω·cm or more and $1.0\times10^8$ Ω·cm or less, preferably $1.0\times10^6$ Ω·cm or more and $5.0\times10^7$ Ω·cm or less. The material for the external additive A is not limited as long as the above-mentioned physical property ranges are satisfied, but is preferably, for example, inorganic particles, such as titanium oxide particles or aluminum oxide particles.

The external additive A particularly preferably contains titanium oxide particles. When the external additive A contains the titanium oxide particles, the resistance value can be easily set to a desired range, and halftone unevenness after endurance is satisfactorily suppressed.

The external additive A more preferably contains rutile-type titanium oxide particles. When the external additive A contains the rutile-type titanium oxide particles, the toner can be efficiently charged without leaking a charge injected from the surface of the electrophotographic photosensitive member to the outside.

The external additive A may be obtained by, for example, adding an aqueous solution of NaOH to metatitanic acid, subjecting the mixture to heating, cooling, neutralization, and the like to produce fine particle rutile-type titanium oxide, and appropriately subjecting the fine particle rutile-type titanium oxide to mixing in a ball mill or the like, firing, and washing.

In addition, the toner may contain, as the external additive other than the external additive A, for example, particulate silica particles, a vinyl-based resin, a polyester resin, a silicone resin, titanium oxide particles, or aluminum oxide particles not having the above-mentioned aspect ratio.

<Method of Producing Toner>

A method of producing the toner in the present invention is not particularly limited, and a known method, such as a pulverization method, a suspension polymerization method, a dissolution suspension method, an emulsion aggregation method, or a dispersion polymerization method, may be used. The toner is preferably produced by the emulsion aggregation method. The emulsion aggregation method is mainly described below.

In addition, the 50% particle diameter (D50) on a volume distribution basis of fine particles of the binder resin in an aqueous dispersion liquid of resin fine particles is preferably 0.05 μm or more and 1.0 μm or less, more preferably 0.05 μm or more and 0.4 μm or less. When the 50% particle diameter (D50) on a volume distribution basis is adjusted to fall within the above-mentioned ranges, toner particles measuring 3 μm or more and 10 μm or less, which is a volume-average particle diameter appropriate as toner particles, can be easily obtained.

The 50% particle diameter (D50) on a volume distribution basis may be measured with a dynamic light scattering-type particle size distribution meter Nanotrac UPA-EX150 (manufactured by Nikkiso Co., Ltd.).

<Colorant Fine Particle Dispersion Liquid>

A colorant fine particle dispersion liquid is used as required. The colorant fine particle dispersion liquid may be prepared by any of known methods given below, but is not limited to these techniques.

The colorant fine particle dispersion liquid may be prepared by mixing a colorant, an aqueous medium, and a dispersant through use of any of known mixing machines, such as a stirring machine, an emulsifying machine, and a dispersing machine. Known dispersants, such as a surfactant and a polymer dispersant, may each be used as the dispersant to be used in this case.

Each of the surfactant and the polymer dispersant serving as the dispersant can be removed in a washing step to be described later, but the dispersant is preferably the surfactant from the viewpoint of washing efficiency.

Examples of the surfactant include: anionic surfactants, such as sulfuric acid ester-based, sulfonic acid salt-based, phosphoric acid ester-based, and soap-based surfactants; cationic surfactants, such as amine salt-type and quaternary ammonium salt-type surfactants; and nonionic surfactants, such as polyethylene glycol-based, alkylphenol ethylene oxide adduct-based, and polyhydric alcohol-based surfactants.

Of those, a nonionic surfactant or an anionic surfactant is preferred. In addition, the nonionic surfactant and the anionic surfactant may be used in combination. The surfactants may be used alone or in combination thereof. When the surfactant is used, the concentration thereof in the aqueous medium is preferably 0.5 mass % or more and 5 mass % or less.

The content of colorant fine particles in the colorant fine particle dispersion liquid is not particularly limited, but is preferably 1 mass % or more and 30 mass % or less with respect to the total mass of the colorant fine particle dispersion liquid.

In addition, with regard to the dispersed particle diameter of the colorant fine particles in the aqueous dispersion liquid of the colorant, a 50% particle diameter (D50) on a volume distribution basis is preferably 0.5 μm or less from the viewpoint of the dispersibility of the colorant in the toner to be finally obtained. In addition, for the same reason, a 90% particle diameter (D90) on a volume distribution basis is preferably 2 μm or less. The dispersed particle diameter of the colorant fine particles dispersed in the aqueous medium may be measured with a dynamic light scattering-type particle size distribution meter (Nanotrac UPA-EX150, manufactured by Nikkiso Co., Ltd.).

Examples of the known mixing machines, such as the stirring machine, the emulsifying machine, and the dispersing machine, to be used in dispersing the colorant in the aqueous medium include an ultrasonic homogenizer, a jet mill, a pressure-type homogenizer, a colloid mill, a ball mill, a sand mill, and a paint shaker. Those mixing machines may be used alone or in combination thereof.

<Releasing Agent (Aliphatic Hydrocarbon Compound) Fine Particle Dispersion Liquid>

A releasing agent fine particle dispersion liquid may be used as required. The releasing agent fine particle dispersion liquid may be prepared by any of known methods given below, but is not limited to these techniques.

The releasing agent fine particle dispersion liquid may be produced by adding a releasing agent to an aqueous medium containing a surfactant, heating the mixture to a temperature equal to or higher than the melting point of the releasing agent, and dispersing the mixture into particles with a homogenizer having a strong shear application capability or a pressure discharge-type dispersing machine, followed by cooling to a temperature lower than the melting point. An example of the homogenizer may be "Clearmix W-Motion" manufactured by M Technique Co., Ltd. In addition, an example of the pressure discharge-type dispersing machine may be "Gaulin Homogenizer" manufactured by Gaulin.

With regard to the dispersed particle diameter of the releasing agent fine particle dispersion liquid in the aqueous dispersion liquid of the releasing agent, a 50% particle diameter (D50) on a volume distribution basis is preferably 0.03 μm or more and 1.0 μm or less, more preferably 0.1 μm or more and 0.5 μm or less. In addition, it is preferred that coarse particles of 1 μm or more be absent.

When the dispersed particle diameter of the releasing agent fine particle dispersion liquid falls within the above-mentioned ranges, the releasing agent can be caused to be present as a fine dispersion in the toner, and hence an exudation effect at the time of fixation can be maximally expressed to provide satisfactory separability. The dispersed particle diameter of the releasing agent fine particle dispersion liquid dispersed in the aqueous medium may be measured with a dynamic light scattering-type particle size distribution meter (Nanotrac UPA-EX150, manufactured by Nikkiso Co., Ltd.).

<Mixing Step>

In a mixing step, a mixed liquid is prepared by mixing a resin fine particle dispersion liquid, and as required, at least one of the releasing agent fine particle dispersion liquid or the colorant fine particle dispersion liquid. The mixing step may be performed using any of known mixing apparatus, such as a homogenizer and a mixer.

<Step of forming Aggregate Particles (Aggregation Step)>

In an aggregation step, for example, the fine particles contained in the mixed liquid prepared in the mixing step are aggregated to form aggregates each having a target particle diameter. At this time, an aggregating agent is added and mixed, and at least one of heating or mechanical power is appropriately applied as required. Thus, there may be formed aggregates in each of which the resin fine particles, and as required, at least one of the releasing agent fine particles or the colorant fine particles are aggregated.

Examples of the aggregating agent include: organic aggregating agents, such as a quaternary salt cationic surfactant and polyethyleneimine; and inorganic aggregating agents, such as inorganic metal salts, such as sodium sulfate, sodium nitrate, sodium chloride, calcium chloride, and calcium nitrate, inorganic ammonium salts, such as ammonium sulfate, ammonium chloride, and ammonium nitrate, and divalent or higher metal complexes.

In addition, an acid may be added in order to reduce a pH to cause soft aggregation, and for example, sulfuric acid or nitric acid may be added.

The aggregating agent may be added in the form of any of dry powder and an aqueous solution dissolved in an aqueous medium, but is preferably added in the form of an aqueous solution in order to cause uniform aggregation to occur.

It is preferred that the addition and mixing of the aggregating agent be performed at a temperature equal to or lower than the glass transition temperature or melting point of the resin contained in the mixed liquid. When the mixing is performed under such temperature condition, the aggregation proceeds in a relatively uniform manner. The mixing of the aggregating agent into the mixed liquid may be performed using any of known mixing apparatus, such as a homogenizer and a mixer. In the aggregation step, aggregates of a toner particles size are formed in the aqueous medium. The volume-average particle diameter of the aggregates to be produced in the aggregation step is preferably 3 μm or more and 10 μm or less. The volume-average particle diameter may be measured with a particle size distribution analyzer based on a Coulter method (Coulter Multisizer III, manufactured by Coulter).

<Step of Obtaining Dispersion Liquid Containing Toner Particles (Fusion Step)>

In a fusion step, first, the dispersion liquid containing the aggregates obtained in the aggregation step is subjected to termination of the aggregation under stirring similar to that in the aggregation step.

The termination of the aggregation is performed by adding an aggregation terminator, such as a base, a chelate compound, or an inorganic salt compound such as sodium chloride, capable of adjusting a pH.

After the dispersion state of the aggregated particles in the dispersion liquid has become stable through the action of the aggregation terminator, the aggregated particles are fused by heating to a temperature equal to or higher than the glass transition temperature or melting point of the binder resin so as to be adjusted to a desired particle diameter. The 50% particle diameter (D50) on a volume distribution basis of the toner particles is preferably 3 μm or more and 10 μm or less.

<Cooling Step>

As required, in a cooling step, the temperature of the dispersion liquid containing the toner particles obtained in the fusion step may be cooled to a temperature lower than at least one of the crystallization temperature or glass transition temperature of the binder resin. When the cooling to a temperature lower than at least one of the crystallization temperature or the glass transition temperature is performed, the occurrence of a depression in the surface of the toner can be suppressed, and shape factors SF1 and SF2 can be set to 125 or less. When the cooling step is performed, a specific cooling rate is 0.5° C./sec or more, preferably 2° C./sec or more, more preferably 4° C./sec or more.

<Posttreatment Step>

In the method of producing the toner in this embodiment, a posttreatment step, such as a washing step, a solid-liquid separation step, or a drying step, may be further performed, and when the posttreatment step is performed, for example, toner particles in a dried state are obtained.

<External Addition Step>

In an external addition step, the toner particles obtained in the drying step are subjected to external addition treatment. Specifically, the above-mentioned external additive A, and as required, inorganic fine particles such as silica, or resin fine particles, such as a vinyl-based resin, a polyester resin, or a silicone resin, serving as the other external additive are added in a dry state with the application of a shear force.

The configuration of the electrophotographic photosensitive member in the present invention is described below.

The electrophotographic photosensitive member in the present invention includes, in this order, an electroconductive support, and a photosensitive layer and a surface protective layer which are formed on the electroconductive support. In FIG. 1, as an example of the electrophotographic photosensitive member, an electrophotographic photosensitive member including a laminate-type photosensitive layer is illustrated. In FIG. 1, an undercoat layer 22, a charge-generating layer 23, a charge-transporting layer 24, and a surface protective layer 25 are laminated on a support 21.

<Surface Protective Layer>

The surface protective layer may contain: a polymerization product of a compound having a polymerizable functional group; and a resin. Examples of the polymerizable functional group or structure include an isocyanate group, a blocked isocyanate group, a methylol group, an alkylated methylol group, an epoxy group, a metal alkoxide structure, a hydroxyl group, an amino group, a carboxyl group, a thiol group, a carboxylic acid anhydride structure, a carbon-carbon double bond, an alkoxy silyl group, and a silanol group. A monomer having a charge-transporting ability may be used as the compound having a polymerizable functional group. The compound having a polymerizable functional group may have a charge-transportable structure as well as a chain-polymerizable functional group.

Examples of the resin include a polyester resin, an acrylic resin, a phenoxy resin, a polycarbonate resin, a polystyrene resin, a phenol resin, a melamine resin, and an epoxy resin. Of those, a polycarbonate resin, a polyester resin, and an acrylic resin are preferred. In addition, the surface protective layer may be formed as a cured film by polymerizing a composition containing a monomer having a polymerizable functional group. A reaction at that time is, for example, a thermal polymerization reaction, a photopolymerization reaction, or a radiation polymerization reaction. Examples of the polymerizable functional group of the monomer having a polymerizable functional group include an acryloyl group and a methacryloyl group. A material having a charge-transporting ability may be used as the monomer having a polymerizable functional group.

The surface protective layer may be formed by preparing a coating liquid for a surface protective layer containing electroconductive particles, the above-mentioned materials, and a solvent, forming a coating film thereof on the photosensitive layer, and drying and/or curing the coating film. Examples of the solvent to be used for the coating liquid include an alcohol-based solvent, a ketone-based solvent, an ether-based solvent, a sulfoxide-based solvent, an ester-based solvent, and an aromatic hydrocarbon-based solvent.

The surface protective layer may contain additives, such as an antioxidant, a UV absorber, a plasticizer, a leveling agent, a slipperiness-imparting agent, and a wear resistance-improving agent. Specific examples thereof include a hindered phenol compound, a hindered amine compound, a sulfur compound, a phosphorus compound, a benzophenone compound, a siloxane-modified resin, a silicone oil, fluorine resin particles, polystyrene resin particles, polyethylene resin particles, silica particles, alumina particles, and boron nitride particles.

The average thickness of the surface protective layer is preferably 0.2 μm or more and 5 μm or less, more preferably 0.5 μm or more and 3 μm or less.

As the titanium oxide particles each containing a niobium atom to be used as the electroconductive particles contained in the surface protective layer, there may be used particles each having any of various shapes, such as a spherical shape, a polyhedral shape, an ellipsoidal shape, a flaky shape, and a needle shape. Of those, particles each having a spherical shape, a polyhedral shape, or an ellipsoidal shape are preferred from the viewpoint that image defects such as black spots are reduced. The titanium oxide particles each containing a niobium atom to be preferably used in the present invention each more preferably have a spherical shape or a polyhedral shape close to a spherical shape.

The titanium oxide particles each containing a niobium atom are preferably anatase-type or rutile-type titanium oxide particles, more preferably titanium oxide particles each having an anatase degree of nearly 100%. When anatase-type titanium oxide is used, charge movement in the surface protective layer is facilitated, and hence injection chargeability becomes satisfactory. Anatase-type titanium oxide particles each having an anatase degree of nearly 100% to be used in one embodiment of the present invention may be produced by a known sulfuric acid method. That is, the particles are obtained by hydrolyzing a solution containing titanium sulfate and titanyl sulfate through heating to produce a hydrous titanium dioxide slurry, and dewatering and firing the titanium dioxide slurry. The anatase degree of the anatase-type titanium oxide to be used in one embodiment of the present invention is preferably 90% or more and 100% or less. In addition, an intermediate layer containing the anatase-type titanium oxide containing a niobium atom in this range satisfactorily and stably achieves a rectifying property, and satisfactorily achieves the above-mentioned effect.

Herein, the "anatase degree" is a value determined by the following equation through measurement of the intensity IA of the strongest interference line of anatase (plane index: 101) and the intensity IR of the strongest interference line of rutile (plane index: 110) in powder X-ray diffraction of titanium oxide.

$$\text{Anatase degree }(\%)=100/(1+1.265\times IR/IA)$$

For such production as to give an anatase degree in the range of from 90% or more to 100% or less, a solution containing titanium sulfate and titanyl sulfate as titanium compounds is hydrolyzed through heating in the production of titanium oxide. According to this method, anatase-type titanium oxide having an anatase degree of nearly 100% is obtained. In addition, when an aqueous solution of titanium tetrachloride is neutralized with an alkali, anatase-type titanium oxide having a high anatase degree is obtained.

The electroconductive particles contained in the surface protective layer of the electrophotographic photosensitive member in the present invention are more preferably anatase-type titanium oxide particles, the particles each having a niobium atom localized in the vicinity of the surface thereof. When the anatase-type titanium oxide particles are each used as a core and the surface thereof is coated with titanium oxide containing a niobium atom, a charge can be easily injected from a charging member brought into contact with the surfaces of the electroconductive particles, and besides, can easily move in the surface protective layer. In addition, such a reduction in resistivity as to cause image smearing is suppressed.

The electroconductive particles contained in the surface protective layer of the electrophotographic photosensitive member in the present invention preferably have a number-average particle diameter of 40 nm or more and 150 nm or less. When the number-average particle diameter of the electroconductive particles is less than 40 nm, the specific surface area of the electroconductive particles is increased to increase moisture adsorption in the vicinity of the electroconductive particles on the surface of the surface protective layer, and hence the resistance of the surface of the surface protective layer is reduced, with the result that image smearing is liable to occur. When the number-average particle diameter is more than 150 nm, the dispersibility of the particles in the surface protective layer is reduced and the area of the interface thereof with the binder resin is also reduced, and hence resistance at the interface is increased to reduce injection chargeability due to the movement of a charge.

<Support>

In the present invention, the support is preferably an electroconductive support having conductivity. In addition, examples of the shape of the support include a cylindrical shape, a belt shape, and a sheet shape. Of those, a cylindrical support is preferred. In addition, the surface of the support may be subjected to, for example, electrochemical treatment such as anodization, blast treatment, or cutting treatment.

A metal, a resin, glass, or the like is preferred as a material for the support.

Examples of the metal include aluminum, iron, nickel, copper, gold, stainless steel, and alloys thereof. Of those, an aluminum support using aluminum is preferred.

In addition, conductivity is preferably imparted to the resin or the glass through treatment involving, for example, mixing or coating the resin or the glass with an electroconductive material.

<Electroconductive Layer>

In the electrophotographic photosensitive member to be used in the present invention, an electroconductive layer may be arranged on the support. The arrangement of the electroconductive layer can conceal flaws and unevenness in the surface of the support, and control the reflection of light on the surface of the support. The electroconductive layer preferably contains electroconductive particles and a resin.

A material for the electroconductive particles contained in the electroconductive layer is, for example, a metal oxide, a metal, or carbon black.

Examples of the metal oxide include zinc oxide, aluminum oxide, indium oxide, silicon oxide, zirconium oxide, tin oxide, titanium oxide, magnesium oxide, antimony oxide, and bismuth oxide. Examples of the metal include aluminum, nickel, iron, nichrome, copper, zinc, and silver.

Of those, a metal oxide is preferably used as the electroconductive particles, and in particular, titanium oxide, tin oxide, and zinc oxide are more preferably used.

When the metal oxide is used as the electroconductive particles, the surface of the metal oxide may be treated with a silane coupling agent or the like, or the metal oxide may be doped with an element, such as phosphorus or aluminum, or an oxide thereof.

In addition, the electroconductive particles are titanium oxide particles, barium sulfate particles, or zinc oxide particles, and are preferably particles each having a niobium atom localized on or in the vicinity of the surface thereof. In addition, when the metal oxide is used as the electroconductive particles, their number-average particle diameter is preferably 1 nm or more and 500 nm or less, more preferably 3 nm or more and 400 nm or less.

Examples of the resin include a polyester resin, a polycarbonate resin, a polyvinyl acetal resin, an acrylic resin, a silicone resin, an epoxy resin, a melamine resin, a polyurethane resin, a phenol resin, and an alkyd resin.

In addition, the electroconductive layer may further contain a concealing agent, such as a silicone oil, resin particles, or titanium oxide.

The electroconductive layer may be formed by preparing a coating liquid for an electroconductive layer containing the above-mentioned materials and a solvent, forming a coating film thereof on the support, and drying the coating film. Examples of the solvent to be used for the coating liquid include an alcohol-based solvent, a sulfoxide-based solvent, a ketone-based solvent, an ether-based solvent, an ester-based solvent, and an aromatic hydrocarbon-based solvent. A dispersion method for dispersing the electroconductive particles in the coating liquid for an electroconductive layer is, for example, a method involving using a paint shaker, a sand mill, a ball mill, or a liquid collision-type high-speed disperser.

When the electrophotographic photosensitive member includes an electroconductive layer, an average thickness thereof is preferably 1 μm or more and 40 μm or less, particularly preferably 3 μm or more and 30 μm or less.

<Undercoat Layer>

In the present invention, an undercoat layer may be arranged on the support or the electroconductive layer. The arrangement of the undercoat layer can improve an adhesive function between layers to impart a charge injection-inhibiting function.

The undercoat layer preferably contains a resin. In addition, the undercoat layer may be formed as a cured film by polymerizing a composition containing a monomer having a polymerizable functional group.

Examples of the resin include a polyester resin, a polycarbonate resin, a polyvinyl acetal resin, an acrylic resin, an epoxy resin, a melamine resin, a polyurethane resin, a phenol resin, a polyvinyl phenol resin, an alkyd resin, a polyvinyl alcohol resin, a polyethylene oxide resin, a polypropylene oxide resin, a polyamide resin, a polyamic acid resin, a polyimide resin, a polyamide imide resin, and a cellulose resin.

Examples of the polymerizable functional group or structure of the monomer having a polymerizable functional group include an isocyanate group, a blocked isocyanate group, a methylol group, an alkylated methylol group, an epoxy group, a metal alkoxide structure, a hydroxyl group, an amino group, a carboxyl group, a thiol group, a carboxylic acid anhydride structure, and a carbon-carbon double bond.

In addition, the undercoat layer may further contain an electron-transporting substance, a metal oxide, a metal, an electroconductive polymer, and the like for the purpose of improving electric characteristics. Of those, an electron-transporting substance and a metal oxide are preferably used.

Examples of the electron-transporting substance to be incorporated into the undercoat layer include a quinone compound, an imide compound, a benzimidazole compound, a cyclopentadienylidene compound, a fluorenone compound, a xanthone compound, a benzophenone compound, a cyanovinyl compound, a halogenated aryl compound, a silole compound, and a boron-containing compound. An electron-transporting substance having a polymerizable functional group may be used as the electron-transporting substance and copolymerized with the above-mentioned monomer having a polymerizable functional group to form the undercoat layer as a cured film.

Examples of the metal oxide include indium tin oxide, tin oxide, indium oxide, titanium oxide, zinc oxide, aluminum oxide, and silicon dioxide. Examples of the metal include gold, silver, and aluminum.

The metal oxide particles to be incorporated into the undercoat layer may be subjected to surface treatment with a surface treatment agent such as a silane coupling agent. A general method is used as a method of subjecting the metal oxide particles to the surface treatment. Examples thereof include a dry method and a wet method.

The dry method involves, while stirring the metal oxide particles in a mixer capable of high-speed stirring such as a Henschel mixer, adding an alcoholic aqueous solution, organic solvent solution, or aqueous solution containing the surface treatment agent, uniformly dispersing the mixture, and then drying the dispersion.

In addition, the wet method involves stirring the metal oxide particles and the surface treatment agent in a solvent, or dispersing the metal oxide particles and the surface treatment agent in a solvent with a sand mill or the like using glass beads or the like. After the dispersion, the solvent is removed by filtration or evaporation under reduced pressure. After the removal of the solvent, it is preferred to further perform baking at 100° C. or more.

The undercoat layer may further contain an additive, and for example, may contain: powder of a metal such as aluminum; an electroconductive substance such as carbon black; a charge-transporting substance; a metal chelate compound; or an organometallic compound.

Examples of the charge-transporting substance to be incorporated into the undercoat layer include a quinone compound, an imide compound, a benzimidazole compound, a cyclopentadienylidene compound, a fluorenone compound, a xanthone compound, a benzophenone compound, a cyanovinyl compound, a halogenated aryl compound, a silole compound, and a boron-containing compound. A charge-transporting substance having a polymerizable functional group may be used as the charge-transporting substance and copolymerized with the above-mentioned monomer having a polymerizable functional group to form the undercoat layer as a cured film.

The undercoat layer may be formed by preparing a coating liquid for an undercoat layer containing the above-mentioned materials and a solvent, forming a coating film thereof on the support or the electroconductive layer, and drying and/or curing the coating film.

Examples of the solvent to be used for the coating liquid for an undercoat layer include organic solvents, such as an alcohol, a sulfoxide, a ketone, an ether, an ester, an aliphatic halogenated hydrocarbon, and an aromatic compound. In the present invention, alcohol-based and ketone-based solvents are preferably used.

A dispersion method for preparing the coating liquid for an undercoat layer is, for example, a method involving using a homogenizer, an ultrasonic disperser, a ball mill, a sand mill, a roll mill, a vibration mill, an attritor, or a liquid collision-type high-speed disperser.

When the undercoat layer is arranged, an average thickness thereof is preferably 0.1 μm or more and 10 μm or less, more preferably 0.1 μm or more and 5 μm or less.

<Photosensitive Layer>

The photosensitive layers of the electrophotographic photosensitive member are mainly classified into (1) a laminate-type photosensitive layer and (2) a monolayer-type photosensitive layer, and any of (1) and (2) may be adopted. (1) The laminate-type photosensitive layer is a photosensitive layer having a charge-generating layer containing a charge-generating substance and a charge-transporting layer containing a charge-transporting substance. (2) The monolayer-type photosensitive layer is a photosensitive layer containing both a charge-generating substance and a charge-transporting substance.

(1) Laminate-Type Photosensitive Layer

The laminate-type photosensitive layer has the charge-generating layer and the charge-transporting layer.

(1-1) Charge-Generating Layer

The charge-generating layer preferably contains the charge-generating substance and a resin.

Examples of the charge-generating substance include azo pigments, perylene pigments, polycyclic quinone pigments, indigo pigments, and phthalocyanine pigments. Of those, azo pigments and phthalocyanine pigments are preferred. Of the phthalocyanine pigments, an oxytitanium phthalocyanine pigment, a chlorogallium phthalocyanine pigment, and a hydroxygallium phthalocyanine pigment are preferred.

The content of the charge-generating substance in the charge-generating layer is preferably 40 mass % or more and 85 mass % or less, more preferably 60 mass % or more and 80 mass % or less with respect to the total mass of the charge-generating layer.

Examples of the resin include a polyester resin, a polycarbonate resin, a polyvinyl acetal resin, a polyvinyl butyral resin, an acrylic resin, a silicone resin, an epoxy resin, a melamine resin, a polyurethane resin, a phenol resin, a polyvinyl alcohol resin, a cellulose resin, a polystyrene resin, a polyvinyl acetate resin, and a polyvinyl chloride resin. Of those, a polyvinyl butyral resin is more preferred.

In addition, the charge-generating layer may further contain an additive, such as an antioxidant or a UV absorber. Specific examples thereof include a hindered phenol compound, a hindered amine compound, a sulfur compound, a phosphorus compound, and a benzophenone compound.

The charge-generating layer may be formed by preparing a coating liquid for a charge-generating layer containing the above-mentioned materials and a solvent, forming a coating film thereof on a lower layer such as the undercoat layer, and drying the coating film. Examples of the solvent to be used for the coating liquid include an alcohol-based solvent, a sulfoxide-based solvent, a ketone-based solvent, an ether-based solvent, an ester-based solvent, and an aromatic hydrocarbon-based solvent.

The charge-generating layer has an average thickness of preferably 0.1 μm or more and 1 μm or less, more preferably 0.15 μm or more and 0.4 μm or less.

(1-2) Charge-Transporting Layer

The charge-transporting layer preferably contains the charge-transporting substance and a resin.

Examples of the charge-transporting substance to be incorporated into the charge-transporting layer include a polycyclic aromatic compound, a heterocyclic compound, a hydrazone compound, a styryl compound, an enamine compound, a benzidine compound, a triarylamine compound, and a resin having a group derived from each of those substances. Of those, a triarylamine compound and a benzidine compound are preferred.

The content of the charge-transporting substance in the charge-transporting layer is preferably 25 mass % or more and 70 mass % or less, more preferably 30 mass % or more and 55 mass % or less with respect to the total mass of the charge-transporting layer.

Examples of the resin include a polyester resin, a polycarbonate resin, an acrylic resin, and a polystyrene resin. Of those, a polycarbonate resin and a polyester resin are preferred. A polyarylate resin is particularly preferred as the polyester resin.

A content ratio (mass ratio) between the charge-transporting substance and the resin is preferably from 4:10 to 20:10, more preferably from 5:10 to 12:10.

In addition, the charge-transporting layer may contain an additive, such as an antioxidant, a UV absorber, a plasticizer, a leveling agent, a slipperiness-imparting agent, or a wear resistance-improving agent. Specific examples thereof include a hindered phenol compound, a hindered amine compound, a sulfur compound, a phosphorus compound, a benzophenone compound, a siloxane-modified resin, a silicone oil, fluorine resin particles, polystyrene resin particles, polyethylene resin particles, silica particles, alumina particles, and boron nitride particles.

The charge-transporting layer may be formed by preparing a coating liquid for a charge-transporting layer containing the above-mentioned materials and a solvent, forming a coating film thereof on the charge-generating layer, and drying the coating film. Examples of the solvent to be used for the coating liquid include an alcohol-based solvent, a ketone-based solvent, an ether-based solvent, an ester-based solvent, and an aromatic hydrocarbon-based solvent. Of those solvents, an ether-based solvent or an aromatic hydrocarbon-based solvent is preferred.

The charge-transporting layer has an average thickness of 3 μm or more and 50 μm or less, more preferably 5 μm or more and 40 μm or less, particularly preferably 10 μm or more and 30 μm or less.

(2) Monolayer-Type Photosensitive Layer

The monolayer-type photosensitive layer may be formed by preparing a coating liquid for a photosensitive layer containing the charge-generating substance, the charge-transporting substance, a resin, and a solvent, forming a coating film thereof on a lower layer such as the undercoat layer, and drying the coating film. Examples of the charge-generating substance, the charge-transporting substance, and the resin to be incorporated into the monolayer-type photosensitive layer are the same as those in the section "(1) Laminate-type Photosensitive Layer."

[Process Cartridge]

The process cartridge of the present invention integrally supports the electrophotographic photosensitive member described above and a developing unit, and may further include a charging unit, a transferring unit, and a cleaning unit. In addition, the process cartridge of the present invention has a feature of being detachable from the main body of an electrophotographic image forming apparatus. The "main body of an electrophotographic image forming apparatus" refers to a portion of the electrophotographic image forming apparatus except the process cartridge.

In addition, according to one embodiment of the present invention, there is provided an electrophotographic image forming apparatus including a process cartridge. The electrophotographic image forming apparatus has a feature of including the electrophotographic photosensitive member described above, a charging unit, an exposing unit, a developing unit, and a transferring unit.

Figure 2:
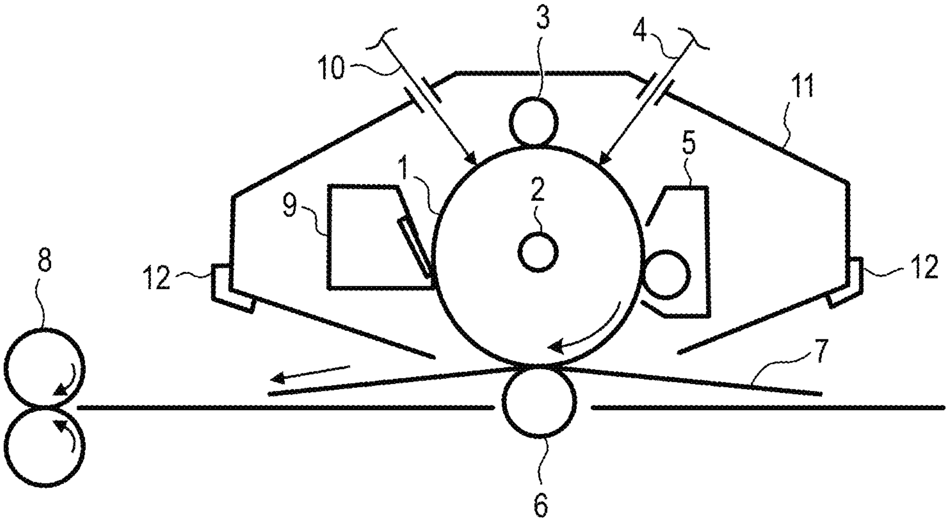
FIG. 2 is an illustration of an example of a schematic configuration of an electrophotographic image forming apparatus including a process cartridge including an electrophotographic photosensitive member.

An example of the schematic configuration of an electrophotographic image forming apparatus including a process cartridge including an electrophotographic photosensitive member is illustrated in FIG. 2.

An electrophotographic photosensitive member 1 of a cylindrical shape (drum shape) is rotationally driven about a shaft 2 in a direction indicated by the arrow at a predetermined peripheral speed (process speed). The surface of the electrophotographic photosensitive member 1 is charged to a predetermined positive or negative potential by a charging unit 3 in the rotational process. In FIG. 2, a roller charging system based on a roller-type charging member is illustrated, but a charging system, such as a corona charging system, a proximity charging system, or an injection charging system, may be adopted. The charged surface of the electrophotographic photosensitive member 1 is irradiated with exposure light 4 from an exposing unit (not shown), and hence an electrostatic latent image corresponding to target image information is formed thereon. The exposure light 4 is light whose intensity has been modulated in correspondence with a time-series electric digital image signal of information on a target image, and is emitted, for example, from an image exposing unit, such as slit exposure or laser beam scanning exposure. Toner accommodated in a toner accommodating portion in a developing unit 5 is supplied to develop (normal development or reversal development) the electrostatic latent image formed on the surface of the electrophotographic photosensitive member 1 to form a toner image on the surface of the electrophotographic photosensitive member 1. The toner image formed on the surface of the electrophotographic photosensitive member 1 is transferred by a transferring unit 6 onto a transfer material 7. At this time, a bias voltage opposite in polarity to charge that the toner possesses is applied from a bias power source (not shown) to the transferring unit 6. In addition, when the transfer material 7 is paper, the transfer material 7 is taken out of a sheet feeding portion (not shown) and supplied to a space between the electrophotographic photosensitive member 1 and the transferring unit 6 in synchronization with the rotation of the electrophotographic photosensitive member 1. The transfer material 7 onto which the toner image has been transferred from the electrophotographic photosensitive member 1 is separated from the surface of the electrophotographic photosensitive member, is conveyed to a fixing unit 8, and is subjected to treatment for fixing the toner image to be printed out as an image-formed product (a print or a copy) to the outside of the electrophotographic image forming apparatus. The electrophotographic image forming apparatus may include a cleaning unit 9 for removing a deposit such as the toner remaining on the surface of the electrophotographic photosensitive member after the transfer. In addition, a so-called cleaner-less system configured to remove the deposit with the developing unit 5 or the like without particular arrangement of the cleaning unit 9 may be used. In the present invention, a plurality of components selected from the electrophotographic photosensitive member 1, the charging unit 3, the developing unit 5, the cleaning unit 9, and the like may be accommodated in a container and integrally supported to form a process cartridge. The process cartridge may be detachable from the main body of the electrophotographic image forming apparatus. For example, the process cartridge is configured as described below. At least one selected from the charging unit 3, the developing unit 5, and the cleaning unit 9 is integrally supported with the electrophotographic photosensitive member 1 to form a cartridge. The cartridge may be used as a process cartridge 11 to be detachable from the main body of the electrophotographic image forming apparatus through use of a guiding unit 12 such as a rail of the main body of the electrophotographic image forming apparatus. The electrophotographic image forming apparatus may include an electricity-removing mechanism configured to subject the surface of the electrophotographic photosensitive member 1 to electricity-removing treatment with pre-exposure light 10 from a pre-exposing unit (not shown). In addition, the guiding unit 12 such as the rail may be arranged in order to mount the process cartridge 11 onto the main body of the electrophotographic image forming apparatus in detachable manner. The electrophotographic image forming apparatus in the present invention may include the electrophotographic photosensitive member 1, and at least one unit selected from the group consisting of: the charging unit 3; the exposing unit; the developing unit 5; and the transferring unit 6.

The process cartridge of the present invention can be used in, for example, a laser beam printer, an LED printer, a copying machine, a facsimile, and a multifunctional peripheral thereof.

Next, measurement methods performed or preferred for various physical properties of the external additive A, the surface protective layer of the photosensitive member, and the electroconductive particles contained in the surface protective layer are described. However, the following description is merely an example, and the measurement methods are not limited thereto.

<Measurement Method for Long Diameter, Short Diameter, and Aspect Ratio of External Additive A>

The long diameter (maximum diameter) and aspect ratio of the external additive A are measured using a scanning electron microscope (e.g., a scanning electron microscope "S-4800" (product name; manufactured by Hitachi, Ltd.)). In a field of view magnified to 50,000 times at maximum, the toner having added thereto the external additive A was observed to randomly measure the long diameters and short diameters of 100 primary particles of the external additive A. Herein, the aspect ratio of the external additive A was calculated by the following equation. The observation magnification is appropriately adjusted depending on the size of the external additive A.

$$\text{Aspect ratio of external additive } A = \text{long diameter of external additive } A \div \text{short diameter of external additive } A$$

For each of the long diameter and the short diameter, the average of the above-mentioned 100 primary particles was taken as a representative value. In addition, the aspect ratio is obtained by dividing the average of the long diameters of the 100 primary particles by the average of the short diameters.

<Measurement Method for Ratio of the Toner Particle Having the External Additive a on the Surface Thereof>

The ratio of the toner particle having the external additive A on the surface thereof to total toner particle was obtained from observation of the toner by using a scanning electron microscope (e.g., a scanning electron microscope "S-4800" (product name; manufactured by Hitachi, Ltd.)). In fields of view magnified to about 3,000 times so as to enable 10 to 30 toner particles to be observed per field of view, 50 toner particles were randomly observed. When the number of the toner particle having one or more particles of the external additive A on the surface thereof in the 50 toner particles is represented by "X", the ratio was calculated from a formula below. The observation magnification is appropriately adjusted depending on the size of the toner and the size of the external additive A.

$$\text{Ratio (number \%)} = X/50 \times 100$$

<Calculation of Primary Particle Diameter of Electroconductive Particles>

First, the electrophotographic photosensitive member was entirely immersed in methyl ethyl ketone (MEK) in a graduated cylinder and irradiated with an ultrasonic wave to peel off resin layers, and then the substrate of the electrophotographic photosensitive member was taken out. Next, insoluble matter that did not dissolve in MEK (the photosensitive layer and the protective layer containing the electroconductive particles) was filtered, and the filtration residue was recovered and brought to dryness with a vacuum dryer. Further, the resultant solid was suspended in a mixed solvent of tetrahydrofuran (THF)/methylol at a volume ratio of 1:1, insoluble matter was filtered, and then the filtration residue was recovered and brought to dryness with a vacuum dryer. Through this operation, the electroconductive particles and the resin of the protective layer were obtained. Further, the filtration residue was heated in an electric furnace to 500° C. so as to leave only the electroconductive particles as solids, and the electroconductive particles were recovered. In order to secure an amount of the electroconductive particles required for measurement, a plurality of electrophotographic photosensitive members were similarly treated.

Part of the recovered electroconductive particles were dispersed in isopropanol (IPA), and the dispersion liquid was dropped onto a grid mesh with a support membrane (manufactured by JEOL Ltd., Cu150J), followed by the observation of the electroconductive particles in the STEM mode of a scanning transmission electron microscope (JEOL Ltd., JEM2800). The observation was performed at a magnification of from 500,000 times to 1,200,000 times so as to facilitate the calculation of the particle diameter of the electroconductive particles, and STEM images of 100 electroconductive particles were taken. At this time, the following settings were adopted: an acceleration voltage of 200 kV, a probe size of 1 nm, and an image size of 1,024×1,024 pixels. With use of the resultant STEM images, a primary particle diameter was measured with image processing software "Image-Pro Plus (manufactured by Media Cybernetics, Inc.)". A method for the measurement was as described below. First, a scale bar displayed in the lower portion of the STEM image is selected using the straight line tool (Straight Line) of the tool bar. When the Set Scale of the Analyze menu is selected under the state, a new window is opened, and the pixel distance of a selected straight line is input in the "Distance in Pixels" column. The value (e.g., 100) of the scale bar is input in the "Known Distance" column of the window, and the unit (e.g., nm) of the scale bar is input in the "Unit of Measurement" column thereof, followed by the clicking of OK. Thus, scale setting is completed. Next, a straight line is drawn so as to coincide with the maximum diameter of an electroconductive particle using the straight line tool, and the particle diameter is calculated. This operation was performed for 100 electroconductive particles, and the number average of the resultant values (maximum diameters) was adopted as the primary particle diameter of the electroconductive particles.

<Calculation of Niobium Atom/Titanium Atom Concentration Ratio>

One 5 mm square sample piece was cut out of the photosensitive member, and was cut to a thickness of 200 nm with an ultrasonic ultramicrotome (Leica, UC7) at a cutting speed of 0.6 mm/s to produce a slice sample. The slice sample was observed at a magnification of from 500,000 times to 1,200,000 times in the STEM mode of a scanning transmission electron microscope (JEOL Ltd., JEM2800) having connected thereto an EDS analyzer (energy-dispersive X-ray spectrometer).

Of the cross-sections of the electroconductive particles observed, cross-sections of electroconductive particles each having a maximum diameter that was about 0.9 or more times and about 1.1 or less times as large as the primary particle diameter calculated in the foregoing were selected through visual observation. Subsequently, spectra of the constituent elements of the selected cross-sections of electroconductive particles were collected using the EDS analyzer to produce EDS mapping images. The collection and analysis of the spectra were performed using NSS (Thermo Fisher Scientific). Collection conditions were set to an acceleration voltage of 200 kV, a probe size of 1.0 nm or 1.5 nm appropriately selected so as to achieve a dead time of 15 or more and 30 or less, a mapping resolution of 256×256, and a Frame number of 300. The EDS mapping images were obtained for 100 cross-sections of electroconductive particles.

The thus obtained EDS mapping images were each analyzed to calculate a ratio between a niobium atom concentration (atom %) and a titanium atom concentration (atom %) at each of the central portion of a particle and an inside portion at 5% of the maximum diameter of a measurement particle from the surface of the particle. Specifically, the analysis was performed by the following method. First, the "Line Extraction" button of NSS is pressed to draw a straight line so as to coincide with the maximum diameter of the particle, and information is obtained on an atom concentration (atom %) on the straight line extending from one surface, passing through the inside of the particle, and reaching the other surface. When the maximum diameter of the particle obtained at this time falls within the range of less than 0.9 times or more than 1.1 times the primary particle diameter calculated in the foregoing, the particle is excluded from the subsequent analysis. (Only particles each having a maximum diameter in the range of from 0.9 or more times to less than 1.1 times the primary particle diameter were subjected to the analysis described below.) Next, on the surfaces on both sides of the particle, the niobium atom concentration (atom %) at the inside portion at 5% of the maximum diameter of the measurement particle from the surface of the particle is read. Similarly, the "titanium atom concentration (atom %) at the inside portion at 5% of the maximum diameter of the measurement particle from the surface of the particle" is obtained. Then, with use of those values, the "concentration ratio between the niobium atom and the titanium atom at the inside portion at 5% of the maximum diameter of the measurement particle from the surface of the particle" is obtained from the following equation for each of the surfaces on both sides of the particle.

(Concentration ratio between niobium atom and titanium atom at inside portion at 5% of maximum diameter of measurement particle from surface of particle)=(niobium atom concentration (atom %) at inside portion at 5% of maximum diameter of measurement particle from surface of particle)/(titanium atom concentration (atom %) at inside portion at 5% of maximum diameter of measurement particle from surface of particle)

Of the two concentration ratios obtained, the one with a smaller value is adopted as the "concentration ratio between the niobium atom and the titanium atom at the inside portion at 5% of the maximum diameter of the measurement particle from the surface of the particle" in the present invention.

In addition, a niobium atom concentration (atom %) and a titanium atom concentration (atom %) at a position located on the above-mentioned straight line and coinciding with the middle point of the maximum diameter are read. With use of those values, the "concentration ratio between the niobium atom and the titanium atom at the central portion of the particle" is obtained from the following equation.

Concentration ratio between niobium atom and titanium atom at central portion of particle=(niobium atom concentration (atom %) at central portion of particle)/(titanium atom concentration (atom %) at central portion of particle)

The "concentration ratio calculated as niobium atom concentration/titanium atom concentration at the inside portion at 5% of the maximum diameter of the measurement particle from the surface of the particle relative to the concentration ratio calculated as niobium atom concentration/titanium atom concentration at the central portion of the particle" is calculated by the following expression.

(Concentration ratio between niobium atom and titanium atom at inside portion at 5% of maximum diameter of measurement particle from surface of particle)/(concentration ratio between niobium atom and titanium atom at central portion of particle)

Next, four 5 mm square sample pieces were cut out of the photosensitive member, and the surface protective layer was reconstructed into a three-dimensional object of 2 μm×2 μm×2 μm with Slice&View of FIB-SEM. Based on a difference in contrast of Slice&View of FIB-SEM, the content of the electroconductive particles in the total volume of the surface protective layer was calculated. In the following Examples, the conditions of Slice&View were as described below.

Processing of sample for analysis: FIB method
Processing and observation apparatus: NVision 40 manufactured by SII/Zeiss
Slice spacing: 10 nm
Observation Conditions:
Acceleration voltage: 1.0 kV
Sample tilt: 54°
WD: 5 mm
Detector: BSE detector
Aperture: 60 high current
ABC: ON
Image resolution: 1.25 nm/pixel An analysis region is set to 2 μm long by 2 μm wide, and information for each cross-section is integrated to determine the volume V of a specimen per 2 μm length×2 μm width×2 μm thickness (8 $\mu m^3$). In addition, a measurement environment had a temperature of 23° C. and a pressure of $1\times10^4$ Pa. Strata 400S manufactured by FEI (sample tilt: 52°) may also be used as a processing and observation apparatus. In addition, the information for each cross-section was obtained through image analysis of the area of an identified electroconductive particle. The image analysis was performed using image processing software (manufactured by Media Cybernetics, Image-Pro Plus).

Based on the resultant information, the volume V of the electroconductive particles in a volume of 2 μm×2 μm×2 μm (unit volume: 8 $\mu m^3$) was determined in each of the four sample pieces. Then, (V $\mu m^3$/8 $\mu m^3$×100) was calculated. The average of the (V $\mu m^3$/8 $\mu m^3$×100) values for the four sample pieces was defined as the content [vol %] of the electroconductive particles in the surface protective layer with respect to the total volume of the surface protective layer.

Further, all of the four sample pieces were processed to a boundary between the surface protective layer and the underlying layer to measure the thickness of the surface protective layer, and the value was used for the calculation of a volume resistivity ρv in the following <measurement method for the volume resistivity of the protective layer of the photosensitive member>.

<Measurement of Volume Resistivity of Surface Protective Layer>

A picoampere (pA) meter was used for the measurement of the volume resistivity of the surface protective layer. First, comb-shaped gold electrodes having an electrode-to-electrode distance (D) of 180 μm and a length (L) of 5.9 cm were produced on a PET film by vapor deposition, and a surface protective layer having a thickness (T1) of 2 μm was formed thereon. Next, under an environment having a temperature of 23° C. and a humidity of 50% RH, a DC current (I) at the time of the application of a DC voltage (V) of 100 V between the comb-shaped electrodes was measured. A volume resistivity A (temperature: 23° C./humidity: 50% RH) was obtained by the following equation (7). The results of measurement using this method are not described herein.

$$\text{Volume resistivity } \rho v\ (\Omega\cdot\text{cm}) = V(V)\times T1\ (\text{cm})\times L\ (\text{cm})/\{I(A)\times D\ (\text{cm})\} \quad (7)$$

When the composition, including the electroconductive particles and the binder resin, of the surface protective layer is difficult to identify, the surface resistivity of the surface of the electrophotographic photosensitive member is measured and converted into the volume resistivity. When the volume resistivity of not the surface protective layer alone, but the surface protective layer in a state of coating the surface of the photosensitive member is measured, it is desired that the surface resistivity of the surface protective layer be measured and then converted into the volume resistivity. The surface resistivity ρs may be calculated from the following equation (8) by depositing gold from the vapor to form comb-shaped electrodes on the surface protective layer in a state of coating the photosensitive member, and measuring a DC current at the time of the application of a constant DC voltage. Results shown in Examples below were obtained using this measurement method.

$$\rho v = \rho s \times t \quad (8)$$

"t" represents the thickness of a charge-injecting layer.

This measurement involves measuring a minute current amount, and hence is preferably performed using, as a resistance-measuring apparatus, an instrument capable of measuring a minute current. An example of the resistance-measuring apparatus is a picoammeter 4140B manufactured by Hewlett-Packard Company. The comb-shaped electrodes to be used and the voltage to be applied are each desirably selected in accordance with the material and resistance value of the charge-injecting layer so that an appropriate SN ratio may be obtained.

In the present invention, comb-shaped gold electrodes having an electrode-to-electrode distance (D) of 120 μm and a length (L) of 2.0 cm are produced on the surface of the electrophotographic photosensitive member by vapor deposition. Next, under an environment having a temperature of 23° C. and a humidity of 50% RH, a DC current (I) at the time of the application of a DC voltage (V) of 1,000 V between the comb-shaped electrodes was measured, and a surface resistivity ρs (temperature: 23° C./humidity: 50% RH) was obtained.

Further, the thickness T1 (cm) of the surface protective layer is measured according to the above-mentioned <analysis of the cross-section of the surface protective layer of the electrophotographic photosensitive member>. A volume resistivity ρv (temperature: 23° C./humidity: 50% RH) was obtained by the above-mentioned equation in which the surface resistivity ρs was multiplied by the thickness T1.

<Analysis Method for Niobium Atom Content in Electroconductive Particles>

The measurement of the niobium atom content in the electroconductive particles to be used in the present invention is performed as described below.

The electroconductive particles recovered from the photosensitive member in the foregoing section <Calculation of Primary Particle Diameter of Electroconductive Particles> are pelletized by press molding described below to produce a sample. With use of the produced sample, measurement is performed with an X-ray fluorescence analyzer (XRF), and the niobium atom content of the electroconductive particles as a whole is quantified by an FP method.

Specifically, quantification in terms of niobium pentoxide is performed, followed by conversion into the content of the niobium atom contained.

(i) Example of Apparatus Used

X-ray fluorescence analyzer 3080 (Rigaku Corporation)

(ii) Sample Preparation

A sample press molding machine (manufactured by MAEKAWA Testing Machine MFG. Co., LTD.) is used for the preparation of the sample. 0.5 g of the electroconductive particles are placed in an aluminum ring (model number: 3481E1) and pelletized by being pressed under the setting of a load of 5.0 tons for 1 min.

(iii) Measurement Conditions

Measurement diameter: 10φ

Measurement potential and voltage: 50 kV, from 50 mA to 70 mA

2θ angle: 25.12°

Crystal plate: LiF

Measurement time: 60 seconds

<Powder X-ray Diffraction Measurement of Electroconductive Particles>

A method of judging whether the electroconductive particles to be used for the electrophotographic photosensitive member of the present invention contain anatase-type titanium oxide or rutile-type titanium oxide is described below.

Based on a chart obtained from powder X-ray diffraction with a CuKα X-ray, identification is performed with the inorganic material database (AtomWork) of the National Institute for Materials Science (NIMS). For the electroconductive particles contained in the protective layer of the electrophotographic photosensitive member of the present invention, the treatment of the above-mentioned (quantification of the niobium atom contained in the electroconductive particles) is followed as an example.

Powder X-ray diffraction measurement may be performed under the following conditions.

Measurement apparatus used: X-ray diffraction apparatus RINT-TTRII (manufactured by Rigaku Corporation)

X-ray tube bulb: Cu

Tube voltage: 50 KV

Tube current: 300 mA

Scan method: 2θ/θ scan

Scan speed: 4.0°/min

Sampling interval: 0.02°

Start angle (2θ): 5.0°

Stop angle (2θ): 40.0°

Attachment: standard sample holder

Filter: not used

Incident monochrometer: used

Counter monochrometer: not used

Divergent slit: open

Divergent longitudinal restriction slit: 10.00 mm

Scattering slit: open

Light-receiving slit: open

Flat sheet monochrometer: used

Counter: scintillation counter

EXAMPLES

The present invention is described in more detail below by way of Examples and Comparative Examples. The present invention is by no means limited to the following Examples, and various modifications may be made without departing from the gist of the present invention. In the description in the following Examples, the simple description "part(s)" means part(s) by mass unless otherwise specified.

Production Example of Toner Particles 1

"Synthesis of Polyester Resin 1"

| | |
|---|---|
| Bisphenol A-ethylene oxide 2 mol adduct | 9 parts by mol |
| Bisphenol A-propylene oxide 2 mol adduct | 95 parts by mol |
| Terephthalic acid | 50 parts by mol |
| Fumaric acid | 30 parts by mol |
| Dodecenylsuccinic acid | 25 parts by mol |

The above-mentioned monomers were loaded into a flask with a stirring device, a nitrogen inlet tube, a temperature sensor, and a rectifying column, the temperature was raised to 195° C. in 1 hour, and it was recognized that the inside of the reaction system had been uniformly stirred. 1.0 Part of tin distearate was loaded with respect to 100 parts of those monomers. Further, while produced water was distilled off, the temperature was raised from 195° C. to 250° C. over 5 hours, and a dehydration condensation reaction was performed at 250° C. for an additional 2 hours.

As a result, a polyester resin 1 having a glass transition temperature of 60.2° C., an acid value of 16.8 mgKOH/g, a hydroxyl value of 28.2 mgKOH/g, a weight-average molecular weight of 11,200, and a number-average molecular weight of 4,100 was obtained.

"Synthesis of Polyester Resin 2"

| | |
|---|---|
| Bisphenol A-ethylene oxide 2 mol adduct | 48 parts by mol |
| Bisphenol A-propylene oxide 2 mol adduct | 48 parts by mol |
| Terephthalic acid | 65 parts by mol |
| Dodecenylsuccinic acid | 30 parts by mol |

The above-mentioned monomers were loaded into a flask with a stirring device, a nitrogen inlet tube, a temperature sensor, and a rectifying column, the temperature was raised to 195° C. in 1 hour, and it was recognized that the inside of the reaction system had been uniformly stirred. 0.7 Part of tin distearate was loaded with respect to 100 parts of those monomers. Further, while produced water was distilled off, the temperature was raised from 195° C. to 240° C. over 5 hours, and a dehydration condensation reaction was performed at 240° C. for an additional 2 hours. Then, the temperature was lowered to 190° C., 5 parts by mol of trimellitic anhydride was gradually added, and the reaction was continued at 190° C. for 1 hour.

As a result, a polyester resin 2 having a glass transition temperature of 55.2° C., an acid value of 14.3 mgKOH/g, a hydroxyl value of 24.1 mgKOH/g, a weight-average molecular weight of 43,600, and a number-average molecular weight of 6,200 was obtained.

"Preparation of Resin Particle Dispersion Liquid 1"

| | |
|---|---|
| Polyester resin 1 | 100 parts |
| Methyl ethyl ketone | 50 parts |
| Isopropyl alcohol | 20 parts |

Methyl ethyl ketone and isopropyl alcohol were loaded into a container. After that, the above-mentioned material was gradually loaded, and the mixture was stirred to complete dissolution to provide a solution of the polyester resin 1. The container containing the solution of the polyester resin 1 was set to 65° C., and while the contents were stirred, a 10% aqueous solution of ammonia was gradually added dropwise at a total of 5 parts, and further, 230 parts of ion-exchanged water was gradually added dropwise at a rate of 10 ml/min to cause phase inversion emulsification. Further, the solvent was removed under reduced pressure with an evaporator. Thus, a resin particle dispersion liquid 1 of the polyester resin 1 was obtained. The volume-average particle diameter of resin particles was 135 nm. In addition, a resin particle solid content was adjusted with ion-exchanged water to 20%.

"Preparation of Resin Particle Dispersion Liquid 2"

| | |
|---|---|
| Polyester resin 2 | 100 parts |
| Methyl ethyl ketone | 50 parts |
| Isopropyl alcohol | 20 parts |

Methyl ethyl ketone and isopropyl alcohol were loaded into a container. After that, the above-mentioned material was gradually loaded, and the mixture was stirred to complete dissolution to provide a solution of the polyester resin 2. The container containing the solution of the polyester resin 2 was set to 40° C., and while the contents were stirred, a 10% aqueous solution of ammonia was gradually added dropwise at a total of 3.5 parts, and further, 230 parts of ion-exchanged water was gradually added dropwise at a rate of 10 ml/min to cause phase inversion emulsification. Further, the solvent was removed under reduced pressure. Thus, a resin particle dispersion liquid 2 of the polyester resin 2 was obtained. The volume-average particle diameter of resin particles was 155 nm. In addition, a resin particle solid content was adjusted with ion-exchanged water to 20%.

"Preparation of Colorant Particle Dispersion Liquid"

| | |
|---|---|
| Copper phthalocyanine (pigment blue 15:3) | 45 parts |
| Ionic surfactant NEOGEN RK (manufactured by DKS Co. Ltd.) | 5 parts |
| Ion-exchanged water | 190 parts |

The above-mentioned materials were mixed, and the mixture was dispersed with a homogenizer for 10 minutes, followed by dispersion treatment using an Ultimizer at a pressure of 250 MPa for 20 minutes to provide a colorant particle dispersion liquid having a volume-average particle diameter of colorant particles of 120 nm and a solid content of 20%. ULTRA-TURRAX manufactured by IKA was used as the homogenizer. A counter collision-type wet pulverizer manufactured by Sugino Machine Limited was used as the Ultimizer.

"Preparation of Releasing agent Particle Dispersion Liquid"

| | |
|---|---|
| Releasing agent (hydrocarbon wax, melting point: 79° C.) | 15 parts |
| Ionic surfactant NEOGEN RK (manufactured by DKS Co. Ltd.) | 2 parts |
| Ion-exchanged water | 240 parts |

The above-mentioned materials were heated to 100° C. and sufficiently dispersed with ULTRA-TURRAX T50 manufactured by IKA, and then heated to 115° C. and subjected to dispersion treatment for 1 hour in a pressure discharge-type Gaulin homogenizer to provide a releasing agent particle dispersion liquid having a volume-average particle diameter of 160 nm and a solid content of 20%.

"Production of Toner Particles 1"

| | |
|---|---|
| Resin particle dispersion liquid 1 | 500 parts |
| Resin particle dispersion liquid 2 | 400 parts |
| Colorant particle dispersion liquid | 50 parts |
| Releasing agent particle dispersion liquid | 80 parts |

First, as a core-forming step, the above-mentioned materials were loaded into a round flask made of stainless steel, and were mixed. Subsequently, the contents were dispersed using a homogenizer ULTRA-TURRAX T50 (manufactured by IKA) at 5,000 r/min for 10 minutes. The pH was adjusted to 3.0 by adding a 1.0% aqueous solution of nitric acid, and then the resultant was heated to 58° C. in a water bath for heating with a stirring blade while its rotation speed was appropriately regulated so that the mixed liquid was stirred. The volume-average particle diameter of the formed aggregated particles was appropriately checked using Coulter Multisizer III. At the time point when aggregated particles (cores) having a volume-average particle diameter of 5.0 μm were formed, as a shell-forming step, the following materials were added, and the mixture was further stirred for 1 hour to form shells.

| | |
|---|---|
| Resin particle dispersion liquid 1 | 40 parts |
| Ion-exchanged water | 300 parts |
| 10.0 mass % borax aqueous solution | 19 parts |

(Borax; sodium tetraborate decahydrate, manufactured by FUJIFILM Wako Pure Chemical Corporation)

After that, the pH was adjusted to 9.0 using a 5% aqueous solution of sodium hydroxide, and the resultant was heated to 89° C. while stirring was continued.

At the time point when a desired surface shape was obtained, the heating was stopped, the resultant was cooled to 25° C., filtered, and subjected to solid-liquid separation, followed by washing with ion-exchanged water. After the completion of the washing, the resultant was dried using a vacuum dryer to provide toner particles 1. The resultant toner particles 1 had an X-ray fluorescence intensity derived from boron of 0.15 and a weight-average particle diameter of 6.5 μm.

"Production of Toner Particles 2"

| | |
|---|---|
| Resin particle dispersion liquid 1 | 500 parts |
| Resin particle dispersion liquid 2 | 400 parts |
| Colorant particle dispersion liquid | 50 parts |
| Releasing agent particle dispersion liquid | 80 parts |

First, as a core-forming step, the above-mentioned materials were loaded into a round flask made of stainless steel, and were mixed. Subsequently, the contents were dispersed using a homogenizer ULTRA-TURRAX T50 (manufactured by IKA) at 5,000 r/min for 10 minutes. The pH was adjusted to 3.0 by adding a 1.0% aqueous solution of nitric acid, and then the resultant was heated to 58° C. in a water bath for heating with a stirring blade while its rotation speed was appropriately regulated so that the mixed liquid was stirred. The volume-average particle diameter of the formed aggregated particles was appropriately checked using Coulter Multisizer III. At the time point when aggregated particles (cores) having a volume-average particle diameter of 5.0 μm were formed, as a shell-forming step, the following materials were added, and the mixture was further stirred for 1 hour to form shells.

| | |
|---|---|
| Resin particle dispersion liquid 1 | 40 parts |
| Ion-exchanged water | 300 parts |

After that, the pH was adjusted to 9.0 using a 5% aqueous solution of sodium hydroxide, and the resultant was heated to 89° C. while stirring was continued.

At the time point when a desired surface shape was obtained, the heating was stopped, the resultant was cooled to 25° C., filtered, and subjected to solid-liquid separation, followed by washing with ion-exchanged water. After the completion of the washing, the resultant was dried using a vacuum dryer to provide toner particles 2. The resultant toner particles 2 had a weight-average particle diameter of 6.6

Production Example of External Additive 1

An external additive 1 serving as the external additive A was produced as described below. To metatitanic acid obtained by a sulfuric acid method, a 50%-NaOH aqueous solution was added in a 4-fold molar amount in terms of NaOH with respect to $TiO_2$, and the mixture was heated at 95° C. for 2 hours. After the mixture had been thoroughly washed, 31%-HCl was added at $HCl/TiO_2$=0.26, and the resultant was heated at the boiling point for 1 hour. After cooling, the resultant was neutralized with 1 mol/L-NaOH to a pH of 7, and then washed and dried to produce fine particle rutile-type titanium oxide. The specific surface area of the resultant fine particle rutile-type titanium oxide was 115 $g/m^2$. To 100 parts of the fine particle rutile-type titanium oxide, 100 parts of NaCl and 25 parts of $Na_2P_2O_7.10H_2O$ were added, the whole was mixed in a vibrating ball mill for 1 hour, and the mixture was fired in an electric furnace at 850° C. for 2 hours. The resultant fired product was charged into pure water, heated at 80° C. for 6 hours, and then washed to remove a soluble salt. All the particles obtained by drying were obtained as needle-shaped titanium oxide fine particles each having a short diameter in the range of from 0.03 μm or more to 0.07 μm or less and a long diameter in the range of from 0.4 μm or more to 0.8 μm or less. The physical properties of the thus obtained external additive 1 are shown in Table 1.

Production Examples of External Additives 2 to 14

External additives 2 to 14 each serving as the external additive A were obtained in the same manner as in the production example of the external additive 1 except that the conditions were changed as shown in Table 1. The physical properties of the resultant external additives 2 to 14 are shown in Table 1. Treatment agents shown in Table 1 were used for certain external additives.

TABLE 1

| External additive | Kind | Treatment agent 1: Treatment agent | Treatment agent 1: Treatment amount | Physical properties: Long diameter (nm) | Physical properties: Aspect ratio | Physical properties: Specific resistance (Q · cm) |
|---|---|---|---|---|---|---|
| 1 | Rutile-type titanium oxide | None | — | 800 | 8.0 | 3.0 × $10^7$ |
| 2 | Anatase-type titanium oxide | None | — | 800 | 8.0 | 6.0 × $10^6$ |
| 3 | Rutile-type titanium oxide | $Al(OH)_3$ | 10 mass % | 800 | 8.0 | 1.0 × $10^8$ |
| 4 | Anatase-type titanium oxide | $SnO_2/Sb_2O_3$ | 10 mass % | 800 | 8.0 | 1.0 × $10^5$ |
| 5 | Rutile-type titanium oxide | None | — | 500 | 6.3 | 1.0 × $10^7$ |
| 6 | Rutile-type titanium oxide | None | — | 120 | 5.0 | 1.0 × $10^7$ |
| 7 | Rutile-type titanium oxide | $Al(OH)_3$ | 10 mass % | 1,700 | 15.5 | 1.0 × $10^7$ |
| 8 | Rutile-type titanium oxide | None | — | 2,860 | 19.1 | 1.0 × $10^7$ |
| 9 | Rutile-type titanium oxide | None | — | 120 | 5.0 | 4.0 × $10^8$ |
| 10 | Rutile-type titanium oxide | None | — | 120 | 5.0 | 7.0 × $10^4$ |
| 11 | Rutile-type titanium oxide | None | — | 800 | 4.5 | 1.0 × $10^7$ |
| 12 | Anatase-type titanium oxide | None | — | 90 | 4.5 | 1.0 × $10^7$ |
| 13 | Rutile-type titanium oxide | None | — | 5,150 | 19.1 | 1.0 × $10^7$ |
| 14 | Aluminum oxide | $SnO_2/Sb_2O_3$ | 20 mass % | 600 | 7.5 | 9.0 × $10^7$ |

Production Example of External Additive 15

An external additive 15 serving as an external additive that does not fall within the category of the external additive A is silica particles obtained by subjecting base material silica particles having a BET specific surface area of 170 $m^2/g$ to hydrophobizing treatment with hexamethyldisilazane.

Production Example of Toner 1

| | |
|---|---|
| Toner particles 1 | 100.0 parts |
| External additive 1 | 0.60 part |
| External additive 15 | 0.80 part |

The above-mentioned materials were mixed using a Henschel mixer (manufactured by Nippon Coke & Engineering Co., Ltd.) at 3,000 rpm for 15 minutes to provide a toner 1. The toner was observed using a scanning electron microscope, and as a result, it was found that the ratio of toner particles for each of which it was able to be recognized that the external additive A was present on the surface thereof was 70 number % or more.

Production Examples of Toners 2 to 17

Toners 2 to 17 were obtained in the same manner as in the production example of the toner 1 except that the conditions were changed as shown in Table 2. The ratios of toner particles for each of which it was able to be recognized that the external additive was present on the surface thereof were as shown in Table 2.

TABLE 2

| Toner | Toner particles | External additive A: External additive | External additive A: Part | Other than external additive A: External additive | Other than external additive A: Part | Ratio: the number of the toner particles having the external additive A/the number of the toner particles number % |
|---|---|---|---|---|---|---|
| 1 | 1 | 1 | 0.6 | 15 | 0.8 | 70 |
| 2 | 2 | 1 | 0.6 | 15 | 0.8 | 70 |
| 3 | 1 | 2 | 0.6 | 15 | 0.8 | 70 |
| 4 | 1 | 3 | 0.6 | 15 | 0.8 | 70 |
| 5 | 1 | 4 | 0.4 | 15 | 0.8 | 45 |
| 6 | 1 | 5 | 0.4 | 15 | 0.8 | 45 |
| 7 | 1 | 6 | 0.4 | 15 | 0.8 | 45 |
| 8 | 1 | 7 | 0.4 | 15 | 0.8 | 45 |
| 9 | 1 | 8 | 0.4 | 15 | 0.8 | 45 |
| 10 | 1 | 6 | 0.2 | 15 | 0.8 | 32 |
| 11 | 1 | 6 | 0.1 | 15 | 0.8 | 25 |
| 12 | 1 | 9 | 0.4 | 15 | 0.8 | 45 |
| 13 | 1 | 10 | 0.4 | 15 | 0.8 | 45 |
| 14 | 1 | 11 | 0.4 | 15 | 0.8 | 45 |
| 15 | 1 | 12 | 0.2 | 15 | 0.8 | 32 |
| 16 | 1 | 13 | 0.4 | 15 | 0.8 | 45 |
| 17 | 1 | 14 | 0.4 | 15 | 0.8 | 45 |

Production Examples of Anatase-type Titanium Oxide Particles 1, and 2, 5, and 6

A solution containing titanium sulfate and titanyl sulfate was hydrolyzed through heating to produce a hydrous titanium dioxide slurry, and the titanium dioxide slurry was dewatered and fired. Thus, anatase-type titanium oxide particles 1 each having an anatase degree of nearly 100% were obtained. Anatase-type titanium oxide particles 2, 5, and 6 each having an anatase degree of nearly 100% were produced by controlling the solution concentration of titanyl sulfate in the above-mentioned method. The physical properties of the resultant anatase-type titanium oxide particles are shown in Table 3.

Production Examples of Anatase-type Titanium Oxide Particles 3, 4, and 7

Niobium sulfate (water-soluble niobium compound) was added to a hydrous titanium dioxide slurry obtained by hydrolyzing an aqueous solution of titanyl sulfate. With regard to its addition amount, niobium sulfate was added at a ratio of 10.0 mass % in terms of niobium ions with respect to the amount of titanium (in terms of titanium dioxide) in the slurry.

The aqueous solution of titanyl sulfate having niobium sulfate added thereto at a ratio of 10.0 mass % in terms of niobium ions was hydrolyzed to provide a hydrous titanium dioxide slurry. Next, the hydrous titanium dioxide slurry containing niobium ions and the like was dewatered and fired at a firing temperature of 1,000° C. Thus, anatase-type titanium oxide particles 3 each containing a niobium atom were obtained.

Anatase-type titanium oxide particles 4 and 7 each containing a niobium atom were obtained by controlling the addition amount of niobium sulfate in the above-mentioned method. The physical properties of the resultant anatase-type titanium oxide particles are shown in Table 3.

Production Examples of Electroconductive Particles 1, and 2, 3, and 5

Niobium(V) hydroxide was dissolved in concentrated sulfuric acid, and the solution was mixed with an aqueous solution of titanium sulfate to prepare an acidic mixed liquid of a niobium salt and a titanium salt (hereinafter referred to as "titanium-niobium mixed liquid").

100 Parts of the anatase-type titanium oxide particles 1 were weighed and dispersed as core particles in water to give a suspension, and 1,000 parts of the aqueous suspension was heated to 670° C. while being stirred.

While the pH was maintained at 2.5, a titanium-niobium mixed liquid having a content of 337 g/kg in terms of Ti and a content of 10.3 g/kg in terms of Nb, and an aqueous solution of sodium hydroxide were simultaneously added with respect to the weight of the anatase-type titanium oxide particles 1. In addition, a titanium-niobium acid solution (weight ratio between a niobium atom and a titanium atom in the solution was 1.0/20.0) was prepared by mixing a niobium solution, which was obtained by dissolving 3 parts of niobium pentachloride ($NbCl_5$) in 100 parts of 11.4 mol/L hydrochloric acid, with 200 parts of a titanium sulfate solution having a content of 12.0 parts in terms of titanium. The titanium-niobium acid solution and a 10.7 mol/L sodium hydroxide solution were simultaneously added dropwise (parallel addition) to the above-mentioned aqueous suspension over 3 hours so that the aqueous suspension had a pH of from 2 to 3. After the completion of the dropwise addition, the suspension was filtered, washed, and dried at 110° C. for 8 hours. The dried product was fired with organic matter in a nitrogen atmosphere at 725° C. for 1 hour to provide niobium atom-containing titanium oxide particles 1 each having a niobium atom localized in the vicinity of its surface.

Next, the following materials were prepared.

| | |
|---|---|
| Niobium atom-containing titanium oxide particles 1 | 100.0 parts |
| Surface treatment agent 1 | 6.0 parts |
| Toluene | 200.0 parts |

The surface treatment agent 1 is a product manufactured under the name of KBM-3033 by Shin-Etsu Chemical Co., Ltd. represented by the following formula (S-1).

(S-1)

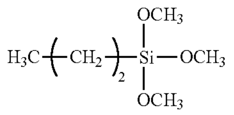

The above-mentioned materials were mixed and stirred with a stirring device for 4 hours, and then filtered and washed, followed further by heating treatment at 130° C. for 3 hours. Thus, electroconductive particles 1 were obtained.

Electroconductive particles 2, 3, and 5 were obtained by controlling the amount of niobium pentachloride in the above-mentioned method so as to achieve weight ratios of niobium atoms with respect to titanium oxide shown in Table 3. The surface physical properties and particle diameters of the resultant electroconductive particles are shown in Table 3.

Production Example of Electroconductive Particles 4

100 g of the spherical anatase-type titanium oxide particles 4 having a number-average particle diameter of 190 nm were dispersed in water to give 1 L of an aqueous suspension, which was heated to 60° C. A titanic acid solution obtained by mixing 600 mL of a titanium sulfate solution having a content of 33.7 g in terms of titanium, and a 10.7 mol/L sodium hydroxide solution were simultaneously added dropwise (parallel addition) over 3 hours so that the suspension had a pH of from 2 to 3. After the completion of the dropwise addition, the suspension was filtered, washed, and dried at 110° C. for 8 hours. The dried product was subjected to heating treatment in an air atmosphere at 800° C. for 1 hour. Thus, electroconductive particles 4, which were made of titanium oxide having a niobium atom localized in the vicinity of its surface, were obtained.

Production Example of Electroconductive Particles 6

The approximately spherical anatase-type titanium oxide particles 6 having a number-average particle diameter of 170 nm were used as electroconductive particles 6. The physical properties of the electroconductive particles 6 are shown in Table 3.

Production Example of Electroconductive Particles 7

The following materials were prepared.

| | |
|---|---|
| Tin oxide particles (product name: S-2000, manufactured by Mitsubishi Materials Corporation): | 100.0 parts |
| Surface treatment agent 2: | 20.0 parts |
| Toluene: | 200.0 parts |

The surface treatment agent 2 is a product manufactured under the name of KBM-3033 by Shin-Etsu Chemical Co., Ltd. represented by the following formula (S-2).

(S-2)

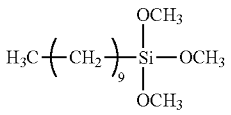

Those materials were mixed and stirred with a stirring device for 4 hours, and then filtered and washed, followed further by heating treatment at 130° C. for 3 hours. Thus, surface treatment was performed to provide electroconductive particles 7.

Production Example of Electroconductive Particles 8

Electroconductive particles 8 were obtained in the same manner as the electroconductive particles 7 except that the tin oxide particles were changed to ones having a number-average particle diameter of 20 nm.

Production Example of Electroconductive Particles 9

The approximately spherical anatase-type titanium oxide particles 7 having a number-average particle diameter of 6 nm and a niobium atom content of 0.5 mass % were used as electroconductive particles 9.

TABLE 3

| | Particles before coating | | | Coating material | | | | |
|---|---|---|---|---|---|---|---|---|
| Electro-conductive particles | Kind | Incorporation of Nb | Number-average particle diameter (nm) | Kind | Incorporation of Nb | Niobium content (mass %) | A/B | Number-average particle diameter (nm) |
| 1 | Anatase-type titanium oxide particles 1 | Absent | 150 | Titanium oxide | Present | 5.0 | 7.9 | 170 |
| 2 | Anatase-type titanium oxide particles 2 | Absent | 160 | Titanium oxide | Present | 5.0 | 7.9 | 180 |
| 3 | Anatase-type titanium oxide particles 3 | Present | 150 | Titanium oxide | Present | 10.0 | 15.8 | 170 |

TABLE 3-continued

| | Particles before coating | | | Coating material | | | | |
|---|---|---|---|---|---|---|---|---|
| Electro-conductive particles | Kind | Incorporation of Nb | Number-average particle diameter (nm) | Kind | Incorporation of Nb | Niobium content (mass %) | A/B | Number-average particle diameter (nm) |
| 4 | Anatase-type titanium oxide particles 4 | Present | 190 | Titanium oxide | Absent | 2.6 | 4.1 | 210 |
| 5 | Anatase-type titanium oxide particles 5 | Absent | 230 | Titanium oxide | Present | 2.0 | 3.2 | 250 |
| 6 | Anatase-type titanium oxide particles 6 | Absent | 170 | Absent | | 0.0 | 0.0 | 170 |
| 7 | Tin oxide particles | Absent | 100 | Absent | | 0.0 | 0.0 | 100 |
| 8 | Tin oxide particles | Absent | 20 | Absent | | 0.0 | 0.0 | 20 |
| 9 | Anatase-type titanium oxide particles 7 | Present | 6 | Absent | | 0.5 | 0.8 | 6 |

In the table, A represents the "concentration ratio between the niobium atom and the titanium atom at the inside portion at 5% of the maximum diameter of the measurement particle from the surface of the particle," and B represents the "concentration ratio between the niobium atom and the titanium atom at the central portion of the particle."

Production Example of Electrophotographic Photosensitive Member 1

An aluminum cylinder having a diameter of 24 mm and a length of 257.5 mm (JIS-A3003, aluminum alloy) was used as a support (electroconductive support).

Production Example 1 of Electroconductive Layer

Next, the following materials were prepared.

| | |
|---|---|
| Titanium oxide ($TiO_2$) particles (average primary particle diameter: 230 nm) coated with oxygen-deficient tin oxide ($SnCO_2$) | 214 parts |
| Phenol resin (product name: PLYOPHEN J-325, manufactured by Dainippon Ink and Chemicals, Inc, resin solid content: 60 mass %) | 132 parts |
| 1-Methoxy-2-propanol | 98 parts |

Those materials were placed in a sand mill using 450 parts of glass beads each having a diameter of 0.8 mm, and were subjected to dispersion treatment under the conditions of a rotation speed of 2,000 rpm, a dispersion treatment time of 4.5 hours, and a preset temperature of cooling water of 18° C. to provide a dispersion liquid. The glass beads were removed from the dispersion liquid with a mesh (aperture: 150 μm). To the resultant dispersion liquid, silicone resin particles (product name: TOSPEARL 120, manufactured by Momentive Performance Materials, average particle diameter: 2 μm) serving as a surface roughness-imparting material were added. The addition amount of the silicone resin particles was set to 10 mass % with respect to the total mass of the metal oxide particles and the binding material in the dispersion liquid after the removal of the glass beads. In addition, a silicone oil (product name: SH28PA, manufactured by Dow Corning Toray Co., Ltd.) serving as a leveling agent was added to the dispersion liquid at 0.01 mass % with respect to the total mass of the metal oxide particles and the binding material in the dispersion liquid.

Next, a mixed solvent of methanol and 1-methoxy-2-propanol (mass ratio: 1:1) was added to the dispersion liquid so that the total mass of the metal oxide particles, the binding material, and the surface roughness-imparting material (i.e., the mass of the solid content) in the dispersion liquid became 67 mass % with respect to the mass of the dispersion liquid. After that, the mixture was stirred to prepare a coating liquid for an electroconductive layer. The coating liquid for an electroconductive layer was applied onto the support by dip coating, and the resultant was heated at 140° C. for 1 hour to form an electroconductive layer having a thickness of 30 μm.

Production Example 1 of Undercoat Layer

Next, the following materials were prepared.

| | |
|---|---|
| Compound represented by the following formula E-1 serving as an electron-transporting substance | 3.0 parts |
| Blocked isocyanate (product name: DURANATE SBB-70P, manufactured by Asahi Kasei Chemicals Corporation) | 6.5 parts |
| Styrene-acrylic resin (product name: UC-3920, manufactured by Toagosei Co., Ltd.) | 0.4 part |
| Silica slurry (product name: IPA-ST-UP, manufactured by Nissan Chemical Industries, Ltd., solid content concentration: 15 mass %, viscosity: 9 mPa · s) | 1.8 parts |
| 1-Butanol | 48 parts |
| Acetone | 24 parts |

The electron-transporting substance (formula E-1) is represented by the following formula.

(E-1)

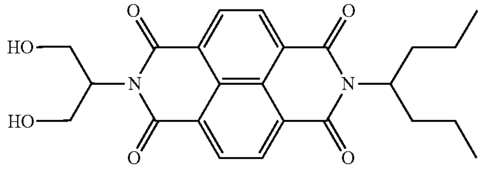

The above-mentioned materials were mixed and dissolved to prepare a coating liquid for an undercoat layer. The coating liquid for an undercoat layer was applied onto the electroconductive layer by dip coating, and the resultant was heated at 170° C. for 30 minutes to form an undercoat layer having a thickness of 0.7 μm.

Next, 10 parts of hydroxygallium phthalocyanine of a crystal form having peaks at positions of 7.5° and 28.4° in a chart obtained by CuKα characteristic X-ray diffraction and 5 parts of a polyvinyl butyral resin (product name: S-LEC BX-1, manufactured by Sekisui Chemical Co., Ltd.) were prepared. Those materials were added to 200 parts of cyclohexanone, and the mixture was dispersed with a sand mill apparatus using glass beads each having a diameter of 0.9 mm for 6 hours.

The resultant was diluted by further adding 150 parts of cyclohexanone and 350 parts of ethyl acetate thereto to provide a coating liquid for a charge-generating layer. The resultant coating liquid was applied onto the undercoat layer by dip coating, followed by drying at 95° C. for 10 minutes to form a charge-generating layer having a thickness of 0.20

Powder X-ray diffraction measurement was performed under the following conditions.

Measurement apparatus used: X-ray diffraction apparatus RINT-TTRII, manufactured by Rigaku Corporation X-ray tube bulb: Cu Tube voltage: 50 KV Tube current: 300 mA Scan method: 2θ/θ scan Scan speed: 4.0°/min Sampling interval: 0.02°

Start angle (2θ): 5.0°

Stop angle (2θ): 40.0°

Attachment: standard sample holder

Filter: not used

Incident monochrometer: used

Counter monochrometer: not used

Divergent slit: open

Divergent longitudinal restriction slit: 10.00 mm

Scattering slit: open

Light-receiving slit: open

Flat sheet monochrometer: used

Counter: scintillation counter

Production Example 1 of Photosensitive Layer

Next, the following materials were prepared.

| | |
|---|---|
| Charge-transporting substance (hole-transportable substance) represented by the following formula (C-1) | 6.0 parts |
| Charge-transporting substance (hole-transportable substance) represented by the following formula (C-2) | 3.0 parts |
| Charge-transporting substance (hole-transportable substance) represented by the following formula (C-3) | 1.0 part |
| Polycarbonate (product name: Iupilon Z400, manufactured by Mitsubishi Engineering-Plastics Corporation) | 10.0 parts |
| Polycarbonate resin having a copolymerization unit of the following formula (C-4) and the following formula (C-5) (x/y = 0.95/0.05: viscosity-average molecular weight = 20,000) | 0.02 part |

Those materials were dissolved in a mixed solvent of 25 parts of o-xylene/25 parts of methyl benzoate/25 parts of dimethoxymethane to prepare a coating liquid for a charge-transporting layer. The coating liquid for a charge-transporting layer was applied onto the charge-generating layer by dip coating to form a coating film, and the coating film was dried at 120° C. for 30 minutes to form a charge-transporting layer having a thickness of 12 μm.

(C-1)

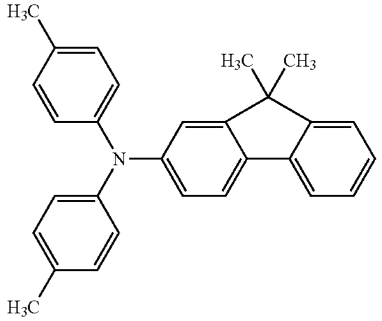

(C-2)

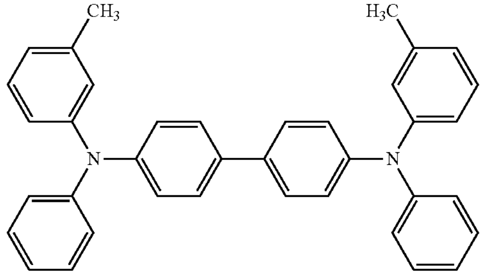

(C-3)

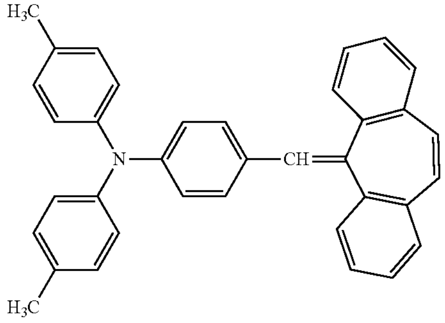

(C-4)

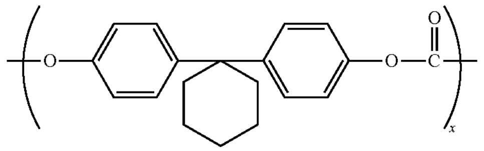

(C-5)

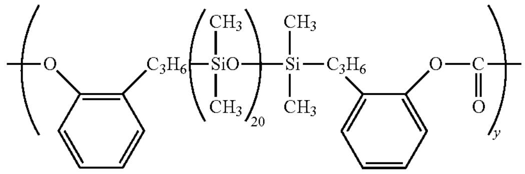

Production Example 1 of Surface Protective Layer

Next, the following materials were prepared.

| | |
|---|---|
| Electroconductive particles 1 | 76.0 parts |
| Compound represented by the following formula (O-1) serving as a binder resin | 76.0 parts |
| 1-Propanol (1-PA) | 100.0 parts |
| Cyclohexane (CH) | 100.0 parts |

The above-mentioned materials were mixed and stirred with a stirring device for 6 hours to prepare a coating liquid 1 for a surface protective layer.

(O-1)

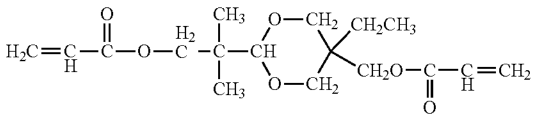

The coating liquid 1 for a surface protective layer was applied onto the charge-transporting layer by dip coating to form a coating film, and the resultant coating film was dried at 50° C. for 6 minutes. After that, under a nitrogen atmosphere, the coating film was irradiated with electron beams for 1.6 seconds under the conditions of an acceleration voltage of 70 kV and a beam current of 5.0 mA while the support (irradiation target body) was rotated at a speed of 300 rpm. The dose of the electron beams at a position on the surface protective layer of the support was 15 kGy. After that, under the nitrogen atmosphere, the temperature of the coating film was increased to 117° C. An oxygen concentration during a period from the electron beam irradiation to the subsequent heating treatment was 10 ppm.

Next, in the air, the coating film was naturally cooled until its temperature became 25° C., and then heating treatment was performed for 1 hour under such a condition that the temperature of the coating film became 120° C., to thereby form a surface protective layer having a thickness of 2 μm. Thus, an electrophotographic photosensitive member 1 including a surface protective layer containing the electroconductive particles 1 was produced. The physical properties of the surface protective layer surface of the photosensitive member are shown in Table 4.

Production Examples of Electrophotographic Photosensitive Members 2 to 4 and 6 to 15

Electrophotographic photosensitive members 2 to 4 and 6 to 15 were produced in the same manner as in Example 1 except that, in the production example of the electrophotographic photosensitive member 1, changes were made as shown in Table 4. The physical properties of the surface protective layer surfaces of the photosensitive members are shown in Table 4.

Production Example of Electrophotographic Photosensitive Member 5

An electrophotographic photosensitive member 5 was obtained in the same manner as in the production example of the electrophotographic photosensitive member 1 except that (Production Example of Surface Protective Layer) was changed as described below.

A coating liquid for a surface protective layer was prepared as described below.

First, the following materials were prepared.

| | |
|---|---|
| Electroconductive particles 9: | 10 parts |
| Compound represented by the following formula (H-7) | 10 parts |
| Polymerization initiator (1-hydroxycyclohexyl(phenyl)methanone) | 1 part |

Those materials were mixed into 40 parts of n-propyl alcohol, and the mixture was dispersed with a sand mill for 2 hours to produce the coating liquid for a protective layer.

The electrophotographic photosensitive member 5 was produced in the same manner as the electrophotographic photosensitive member 1 except that this coating liquid for a protective layer was used. The physical properties of the electrophotographic photosensitive member 5 are shown in Table 4.

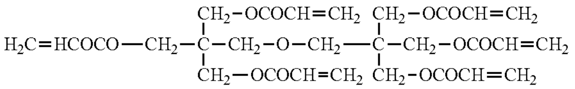

TABLE 4

| Electrophotographic photosensitive member | Electro-conductive particles | Content of electro-conductive particles | Volume resistivity of surface protective layer (Ω · cm) |
|---|---|---|---|
| 1 | 1 | 50% | $2.2 \times 10^{12}$ |
| 2 | 1 | 70% | $5.2 \times 10^{10}$ |
| 3 | 2 | 60% | $1.0 \times 10^{10}$ |
| 4 | 2 | 70% | $1.0 \times 10^{9}$ |
| 5 | 9 | 19% | $4.6 \times 10^{13}$ |
| 6 | 1 | 5% | $1.0 \times 10^{14}$ |
| 7 | 3 | 20% | $7.2 \times 10^{13}$ |
| 8 | 4 | 42% | $1.5 \times 10^{12}$ |
| 9 | 5 | 42% | $5.5 \times 10^{11}$ |
| 10 | 6 | 42% | $3.0 \times 10^{9}$ |
| 11 | 6 | 25% | $3.2 \times 10^{10}$ |
| 12 | 7 | 42% | $2.1 \times 10^{9}$ |
| 13 | 8 | 25% | $1.0 \times 10^{10}$ |
| 14 | 1 | 3% | $1.2 \times 10^{14}$ |
| 15 | 2 | 75% | $5.0 \times 10^{8}$ |

Example 1

The following actual machine evaluations were performed using the toner 1 and the electrophotographic photosensitive member 1. The results of the evaluations are shown in Table 5.

For the actual machine evaluations, a reconstructed machine of a commercially available laser beam printer "LBP7600C" manufactured by Canon Inc. was used. Reconstruction points were as follows: the gear and software of the main body of the evaluation machine were changed to set the rotation speed of a developing roller so as to rotate at a peripheral speed twice as high as that of a drum, and to set a process speed so as to be doubled. In addition, a pre-exposure device in the laser beam printer was removed. Such reconstruction as described above results in a severer mode for evaluating a change in image density.

Next, the electrophotographic image forming apparatus and the unused electrophotographic photosensitive member 1 were left to stand under an environment having a temperature of 23.0° C. and a humidity of 50% RH for 24 hours or more, and then 70 g of the toner 1 and the electrophotographic photosensitive member 1 were mounted onto the cartridge of the electrophotographic image forming apparatus.

Paper used was Business 4200 of a LETTER size (manufactured by Xerox Corporation, 75 g/m$^2$), and had a margin of 50 mm on each of its left and right sides.

<Evaluation of Charge Rising Performance Immediately after Startup of Electrophotographic Image Forming Apparatus>

The reconstructed machine was placed under a 23° C. and 50RH % environment, and a solid image was output on 10 sheets in a single color. For each of the images on the 2nd sheet and the 10th sheet, density measurement is performed at 20 random sites, and the density of the solid image is calculated from the average of the 20 sites. The density was measured with an X-Rite color reflection densitometer (manufactured by X-Rite, Inc., X-Rite 500 Series). The value of a difference in density between the solid images on the 2nd sheet and the 10th sheet obtained was defined as initial charge rising performance, and evaluation was performed by the following evaluation criteria. The result of the evaluation is shown in Table 5.

(Evaluation Criteria)

A: The initial charge rising performance is less than 0.04.

B: The initial charge rising performance is 0.04 or more and less than 0.07.

C: The initial charge rising performance is 0.07 or more and less than 0.10.

D: The initial charge rising performance is 0.10 or more.

<Evaluation of Initial Density Uniformity and Density Uniformity after Endurance>

The reconstructed machine was placed under a 23° C. and 50RH % environment, and as described above, a letter image having a print percentage of 1% was output on 1 sheet, followed by the output of a halftone (40H) image. After that, the letter image having a print percentage of 1% was output on 10,000 sheets, and the halftone (40H) image was output. For each of those halftone images, density uniformity was evaluated based on the following criteria. The "40H image" is a halftone image when, in terms of value obtained by representing 256 gradations in hexadecimal notation, OOH represents solid white (non-image) and FFH represents solid black (entire surface image).

For the evaluation of the density uniformity, density measurement was performed at 20 sites, and the value of a difference in density between the maximum value and the minimum value was determined as the density uniformity. The density was measured with a X-Rite color reflection densitometer (manufactured by X-Rite, Inc., X-Rite 500 Series), and initial density uniformity and density uniformity after endurance were evaluated with the 2nd sheet and the 10,000th sheet, respectively, by the following evaluation criteria. The results of the evaluation are shown in Table 5.

(Evaluation Criteria)

A: The density uniformity is less than 0.04.

B: The density uniformity is 0.04 or more and less than 0.07.

C: The density uniformity is 0.07 or more and less than 0.10.

D: The density uniformity is 0.10 or more.

Examples 2 to 23 and Comparative Examples 1 to 8

Evaluations were performed in the same manner as in Example 1 except that the toner and the electrophotographic photosensitive member were changed to combinations shown in Table 5. The evaluation results of Examples 2 to 23 and Comparative Examples 1 to 8 are shown in Table 5.

TABLE 5

| | | Toner | Electrophotographic photosensitive member | Charge rising performance Initial | | Density uniformity Initial | | Density uniformity After endurance | |
|---|---|---|---|---|---|---|---|---|---|
| Example | 1 | 1 | 1 | 0.02 | A | 0.01 | A | 0.02 | A |
| | 2 | 1 | 2 | 0.01 | A | 0.01 | A | 0.01 | A |
| | 3 | 1 | 3 | 0.01 | A | 0.01 | A | 0.02 | A |
| | 4 | 1 | 4 | 0.02 | A | 0.01 | A | 0.04 | B |
| | 5 | 1 | 5 | 0.02 | A | 0.01 | A | 0.06 | B |
| | 6 | 1 | 6 | 0.05 | B | 0.01 | A | 0.08 | C |
| | 7 | 1 | 7 | 0.03 | A | 0.01 | A | 0.03 | B |
| | 8 | 1 | 8 | 0.03 | A | 0.02 | A | 0.04 | B |
| | 9 | 1 | 9 | 0.02 | A | 0.04 | B | 0.05 | B |
| | 10 | 1 | 10 | 0.05 | B | 0.04 | B | 0.06 | B |
| | 11 | 1 | 11 | 0.05 | B | 0.04 | B | 0.06 | B |
| | 12 | 1 | 12 | 0.05 | B | 0.06 | C | 0.07 | C |
| | 13 | 1 | 13 | 0.05 | B | 0.04 | B | 0.08 | C |
| | 14 | 2 | 1 | 0.05 | B | 0.01 | A | 0.04 | B |
| | 15 | 3 | 1 | 0.03 | A | 0.01 | A | 0.04 | B |
| | 16 | 4 | 1 | 0.05 | B | 0.01 | A | 0.03 | A |
| | 17 | 5 | 1 | 0.02 | A | 0.01 | A | 0.06 | B |
| | 18 | 6 | 1 | 0.03 | A | 0.01 | A | 0.03 | A |
| | 19 | 7 | 1 | 0.05 | B | 0.01 | A | 0.05 | B |
| | 20 | 8 | 1 | 0.02 | A | 0.01 | A | 0.02 | A |
| | 21 | 9 | 1 | 0.05 | B | 0.01 | A | 0.03 | A |
| | 22 | 10 | 1 | 0.07 | C | 0.01 | A | 0.08 | C |
| | 23 | 17 | 11 | 0.06 | B | 0.06 | C | 0.09 | C |
| Comparative Example | 1 | 1 | 14 | 0.08 | C | 0.01 | A | 0.10 | D |
| | 2 | 7 | 15 | 0.09 | C | 0.01 | A | 0.10 | D |
| | 3 | 11 | 1 | 0.11 | D | 0.01 | A | 0.14 | D |
| | 4 | 12 | 1 | 0.11 | D | 0.01 | A | 0.11 | D |
| | 5 | 13 | 1 | 0.11 | D | 0.01 | A | 0.12 | D |
| | 6 | 14 | 1 | 0.08 | C | 0.01 | A | 0.12 | D |
| | 7 | 15 | 5 | 0.12 | D | 0.01 | A | 0.13 | D |
| | 8 | 16 | 1 | 0.11 | D | 0.01 | A | 0.07 | C |

The process cartridge of the present invention is excellent in charge rising performance of the toner immediately after the startup of the electrophotographic image forming apparatus, and also excellent in stability of charging throughout a long period of time extending from the start of the use of the process cartridge until after endurance. That is, the process cartridge achieving both of the following can be provided: a satisfactory solid image immediately after the startup of the electrophotographic image forming apparatus; and a halftone excellent in density uniformity throughout a long period of time.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A process cartridge that is detachable from a main body of an electrophotographic image forming apparatus, the process cartridge comprising:

an electrophotographic photosensitive member;

a toner; and a developing unit;

the electrophotographic photosensitive member comprising an electroconductive support, a photosensitive layer formed on the electroconductive support, and a surface protective layer formed on the surface of the electrophotographic photosensitive member;

the surface protective layer containing electroconductive titanium oxide particles each containing a niobium atom;

the developing unit being configured to accommodate the toner, and to supply the toner to a surface of the electrophotographic photosensitive member; and the toner comprising toner particles and an external additive A, external additive A having (i) a long diameter of 100 to 3,000 nm, (ii) an aspect ratio of 5.0 or more, and (iii) a specific resistance of $1\times10^5$ to $1\times10^8$ Ω·cm or less, wherein a ratio of a number of the toner particle having the external additive A on surface thereof to a number of the toner particle is 30 number % or more when observed by using a scanning electron microscope, in each of the electroconductive titanium oxide particles, a concentration ratio calculated as niobium atom concentration/titanium atom concentration at an inside portion at 5% of a maximum diameter of a measurement particle from a surface of the particle is 2.0 or more times as high as a concentration ratio calculated as niobium atom concentration/titanium atom concentration at a central portion of the particle, a content of the electroconductive titanium oxide particles in the surface protective layer is 5 to 70 vol %, and the surface protective layer has a volume resistivity of $1.0\times10^9$ to $1.0\times10^{14}$ Ω·cm.

2. The process cartridge according to claim 1, wherein the external additive A is titanium oxide particles.

3. The process cartridge according to claim 1, wherein the external additive A is rutile-type titanium oxide particles.

4. The process cartridge according to claim 1, wherein the toner particles each contain boric acid.

5. The process cartridge according to claim 1, wherein the electroconductive titanium oxide particles each contain 2.6 to 10.0 mass % niobium .

6. The process cartridge according to claim 5, wherein a ratio of the electroconductive titanium oxide particles in the surface protective layer is 40 to 70 vol %, and the volume resistivity of the surface protective layer is $1.0\times10^{10}$ to $1.0\times10^{14}$ Ω·cm.

7. The process cartridge according to claim 1, wherein the external additive A has a long diameter of 500 to 2,000 nm.

8. The process cartridge according to claim 1, wherein the surface protective layer has a volume resistivity of $1.0\times10^9$ to $7.2\times10^{13}$ Ω·cm.

9. An electrophotographic image forming apparatus, comprising:

an electrophotographic photosensitive member;

a toner; and a developing unit;

the electrophotographic photosensitive member comprising an electroconductive support, a photosensitive layer formed on the electroconductive support, and a surface protective layer formed on the surface of the electrophotographic photosensitive member;

the protective layer comprises electroconductive titanium oxide particles each containing a niobium atom;

the developing unit being configured to accommodate the toner, and to supply the toner to a surface of the electrophotographic photosensitive member; and the toner contains toner particles and an external additive A, external additive A having (i) a long diameter of 100 to 3,000 nm, (ii) an aspect ratio of 5.0 or more, and (iii) a specific resistance of $1\times10^5$ to $1\times10^8$ Ω·cm, wherein a ratio of a number of the toner particle having the external additive A on surface thereof to a number of the toner particle is 30 number % or more when observed by using a scanning electron microscope, in each of the electroconductive titanium oxide particles, a concentration ratio calculated as niobium atom concentration/titanium atom concentration at an inside portion at 5% of a maximum diameter of a measurement particle from a surface of the particle is 2.0 or more times as high as a concentration ratio calculated as niobium atom concentration/titanium atom concentration at a central portion of the particle, a content of the electroconductive particles in the surface protective layer is 5 to 70 vol %, and the surface protective layer has a volume resistivity of $1.0\times10^9$ to $1.0\times10^{14}$ Ω·cm.

10. The electrophotographic image forming apparatus according to claim 9, wherein the external additive A is titanium oxide particles.

11. The electrophotographic image forming apparatus according to claim 9, wherein the external additive A is rutile-type titanium oxide particles.

12. The electrophotographic image forming apparatus according to claim 9, wherein the toner particles each contain boric acid.

13. The electrophotographic image forming apparatus according to claim 9, wherein the electroconductive titanium oxide particles each contain 2.6 to 10.0 mass % niobium.

14. The electrophotographic image forming apparatus according to claim 13, wherein a ratio of the electroconductive particles in the surface protective layer is 40 to 70 vol %, and the volume resistivity of the surface protective layer is $1.0\times10^{10}$ to $1.0\times10^{14}$ Ω·cm.

15. The electrophotographic image forming apparatus according to claim 9, wherein the external additive A has a long diameter of 500 to 2,000 nm.

16. The electrophotographic image forming apparatus according to claim 9, wherein the surface protective layer has a volume resistivity of $1.0\times10^9$ to $7.2\times10^{13}$ Ω·cm.

* * * * *